United States Patent
Fay et al.

(10) Patent No.: US 10,419,791 B2
(45) Date of Patent: Sep. 17, 2019

(54) METHODS, INFORMATION PROVIDING SYSTEM, AND RECEPTION APPARATUS FOR DISTRIBUTION OF AT LEAST ONE CONTENT VERSION

(71) Applicant: Saturn Licensing LLC, New York, NY (US)

(72) Inventors: Luke Fay, San Diego, CA (US);
Frederick J. Zustak, Poway, CA (US);
Peter Shintani, San Diego, CA (US);
Brant Candelore, San Diego, CA (US)

(73) Assignee: SATURN LICENSING LLC, New York, NY (US)

( * ) Notice: Subject to any disclaimer, the term of this patent is extended or adjusted under 35 U.S.C. 154(b) by 19 days.

(21) Appl. No.: 14/686,277

(22) Filed: Apr. 14, 2015

(65) Prior Publication Data
US 2015/0222941 A1 Aug. 6, 2015

Related U.S. Application Data

(63) Continuation of application No. 13/934,549, filed on Jul. 3, 2013, now Pat. No. 9,038,095.

(51) Int. Cl.
*H04N 21/23* (2011.01)
*H04N 21/44* (2011.01)
(Continued)

(52) U.S. Cl.
CPC ..... *H04N 21/23605* (2013.01); *H04N 21/234* (2013.01); *H04N 21/2381* (2013.01);
(Continued)

(58) Field of Classification Search
CPC ............................................. H04N 21/23605
(Continued)

(56) References Cited

U.S. PATENT DOCUMENTS 8,595,783 B2 11/2013 Dewa
8,705,933 B2 4/2014 Eyer
(Continued)

FOREIGN PATENT DOCUMENTS

JP 8-331543 A 12/1996
KR 10-0847128 B1 7/2008
(Continued)

OTHER PUBLICATIONS

U.S. Appl. No. 14/295,695, filed Jun. 4, 2014, Eyer.
(Continued)

*Primary Examiner* — Jefferey F Harold
*Assistant Examiner* — Justin B Sanders
(74) *Attorney, Agent, or Firm* — Oblon, McClelland, Maier & Neustadt, L.L.P.

(57) ABSTRACT

An information providing system, reception apparatus, and methods thereof are provided for providing content data. The method for providing content includes generating the content data. A digital television pre-broadcast signal, including the content data, is generated. At least one portion of the digital television pre-broadcast signal is extracted. The at least one portion of the digital television pre-broadcast signal is packaged into one or more Internet Protocol (IP) data packets. A digital television broadcast signal, including the remainder of the digital television pre-broadcast signal, is generated. The one or more IP data packets is provided via a communication network. The digital television broadcast signal is provided on a predetermined radio frequency (RF) channel.

15 Claims, 19 Drawing Sheets

(51) Int. Cl.
*H04N 21/236* (2011.01)
*H04N 21/234* (2011.01)
*H04N 21/2383* (2011.01)
*H04N 21/438* (2011.01)
*H04N 21/434* (2011.01)
*H04N 21/643* (2011.01)
*H04N 21/2381* (2011.01)
*H04N 21/462* (2011.01)
*H04N 21/63* (2011.01)
*H04N 21/2343* (2011.01)

(52) U.S. Cl.
CPC ... *H04N 21/2383* (2013.01); *H04N 21/23439* (2013.01); *H04N 21/4343* (2013.01); *H04N 21/4382* (2013.01); *H04N 21/44* (2013.01); *H04N 21/4622* (2013.01); *H04N 21/631* (2013.01); *H04N 21/64322* (2013.01)

(58) Field of Classification Search
USPC .......................................................... 725/27
See application file for complete search history.

(56) References Cited

U.S. PATENT DOCUMENTS

| | | |
|---|---|---|
| 8,839,338 B2 | 9/2014 | Eyer |
| 8,842,974 B2 | 9/2014 | Kitazato |
| 8,863,171 B2 | 10/2014 | Blanchard et al. |
| 8,872,888 B2 | 10/2014 | Kitazato |
| 8,875,169 B2 | 10/2014 | Yamagishi |
| 8,875,204 B2 | 10/2014 | Kitazato |
| 8,884,800 B1 | 11/2014 | Fay |
| 8,886,009 B2 | 11/2014 | Eyer |
| 8,892,636 B2 | 11/2014 | Yamagishi |
| 8,893,210 B2 | 11/2014 | Eyer |
| 8,896,755 B2 | 11/2014 | Kitazato et al. |
| 8,898,720 B2 | 11/2014 | Eyer |
| 8,898,723 B2 | 11/2014 | Eyer |
| 8,904,417 B2 | 12/2014 | Kitahara et al. |
| 8,908,103 B2 | 12/2014 | Kitazato |
| 8,909,694 B2 | 12/2014 | Yamagishi et al. |
| 8,914,832 B2 | 12/2014 | Yamagishi |
| 8,917,358 B2 | 12/2014 | Eyer |
| 8,918,801 B2 | 12/2014 | Kitazato et al. |
| 8,925,016 B2 | 12/2014 | Eyer |
| 8,930,988 B2 | 1/2015 | Kitazato et al. |
| 8,938,756 B2 | 1/2015 | Kitazato |
| 8,941,779 B2 | 1/2015 | Eyer |
| 8,966,564 B2 | 2/2015 | Kitazato |
| 8,988,612 B2 | 3/2015 | Kitazato |
| 2008/0273589 A1* | 11/2008 | Kim ............ H04H 60/07 375/240.01 |
| 2009/0225983 A1* | 9/2009 | Reinoso ............ H04N 7/1675 380/212 |
| 2010/0011117 A1 | 1/2010 | Hristodorescu et al. |
| 2010/0011393 A1 | 1/2010 | Lecomte et al. |
| 2010/0149427 A1 | 6/2010 | Limberg |
| 2011/0088075 A1 | 4/2011 | Eyer |
| 2011/0213681 A1* | 9/2011 | Shahid ............ G06Q 30/02 705/27.1 |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2012/0047531 A1 | 2/2012 | Eyer |
| 2012/0050619 A1 | 3/2012 | Kitazato et al. |
| 2012/0054214 A1 | 3/2012 | Yamagishi et al. |
| 2012/0054235 A1 | 3/2012 | Kitazato et al. |
| 2012/0054268 A1 | 3/2012 | Yamagishi |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081607 A1 | 4/2012 | Kitazato |
| 2012/0082266 A1 | 4/2012 | Kitazato et al. |
| 2012/0084802 A1 | 4/2012 | Kitazato |
| 2012/0099656 A1* | 4/2012 | Ohya ............ H04N 21/234327 375/240.23 |
| 2012/0185888 A1 | 7/2012 | Eyer et al. |
| 2012/0253826 A1 | 10/2012 | Kitazato et al. |
| 2013/0024894 A1 | 1/2013 | Eyer |
| 2013/0028335 A1 | 1/2013 | Limberg |
| 2013/0036440 A1 | 2/2013 | Eyer |
| 2013/0055313 A1 | 2/2013 | Eyer |
| 2013/0081088 A1 | 3/2013 | Hwang et al. |
| 2013/0103716 A1 | 4/2013 | Yamagishi |
| 2013/0124683 A1* | 5/2013 | Watanabe ......... H04N 21/4622 709/217 |
| 2013/0145414 A1 | 6/2013 | Yamagishi |
| 2013/0191860 A1 | 7/2013 | Kitazato et al. |
| 2013/0201399 A1 | 8/2013 | Kitazato et al. |
| 2013/0205327 A1 | 8/2013 | Eyer |
| 2013/0212634 A1 | 8/2013 | Kitazato |
| 2013/0254824 A1 | 9/2013 | Eyer |
| 2013/0282870 A1 | 10/2013 | Dewa et al. |
| 2013/0283311 A1 | 10/2013 | Eyer |
| 2013/0283328 A1 | 10/2013 | Kitazato |
| 2013/0291022 A1 | 10/2013 | Eyer |
| 2013/0340007 A1 | 12/2013 | Eyer |
| 2014/0013347 A1 | 1/2014 | Yamagishi |
| 2014/0013379 A1 | 1/2014 | Kitazato et al. |
| 2014/0020038 A1 | 1/2014 | Dewa |
| 2014/0020042 A1 | 1/2014 | Eyer |
| 2014/0040965 A1 | 2/2014 | Kitazato et al. |
| 2014/0040968 A1 | 2/2014 | Kitazato et al. |
| 2014/0043540 A1 | 2/2014 | Kitazato et al. |
| 2014/0053174 A1 | 2/2014 | Eyer et al. |
| 2014/0067922 A1 | 3/2014 | Yamagishi et al. |
| 2014/0099078 A1 | 4/2014 | Kitahara et al. |
| 2014/0122528 A1 | 5/2014 | Yamagishi |
| 2014/0137153 A1 | 5/2014 | Fay et al. |
| 2014/0137165 A1 | 5/2014 | Yamagishi |
| 2014/0150040 A1 | 5/2014 | Kitahara et al. |
| 2014/0157304 A1 | 6/2014 | Fay et al. |
| 2014/0186008 A1 | 7/2014 | Ever |
| 2014/0208375 A1 | 7/2014 | Fay et al. |
| 2014/0208380 A1 | 7/2014 | Fay et al. |
| 2014/0229580 A1 | 8/2014 | Yamagishi |
| 2014/0229979 A1 | 8/2014 | Kitazato et al. |
| 2014/0253683 A1 | 9/2014 | Eyer et al. |
| 2014/0327825 A1 | 11/2014 | Eyer |
| 2014/0348448 A1 | 11/2014 | Eyer |
| 2014/0348488 A1 | 11/2014 | Eyer |
| 2014/0351877 A1 | 11/2014 | Eyer |
| 2014/0354890 A1 | 12/2014 | Eyer |
| 2015/0007215 A1 | 1/2015 | Fay et al. |
| 2015/0007219 A1 | 1/2015 | Blanchard et al. |
| 2015/0007242 A1 | 1/2015 | Fay |
| 2015/0012588 A1 | 1/2015 | Yamagishi |
| 2015/0012933 A1 | 1/2015 | Fay et al. |
| 2015/0012955 A1 | 1/2015 | Kitazato |
| 2015/0020146 A1 | 1/2015 | Eyer |
| 2015/0026730 A1 | 1/2015 | Eyer |
| 2015/0026739 A1 | 1/2015 | Kitazato |
| 2015/0033280 A1 | 1/2015 | Fay |
| 2015/0038100 A1 | 2/2015 | Fay |
| 2015/0046937 A1 | 2/2015 | Kitazato et al. |
| 2015/0046942 A1 | 2/2015 | Eyer |
| 2015/0058410 A1 | 2/2015 | Yamagishi et al. |
| 2015/0058875 A1 | 2/2015 | Kitahara et al. |
| 2015/0058906 A1 | 2/2015 | Kitazato et al. |
| 2015/0058911 A1 | 2/2015 | Kitazato et al. |
| 2015/0062428 A1 | 3/2015 | Eyer |
| 2015/0067713 A1 | 3/2015 | Yamagishi |
| 2015/0074704 A1 | 3/2015 | Kitazato |
| 2015/0082367 A1 | 3/2015 | Kitazato |
| 2015/0271247 A1* | 9/2015 | Patsiokas ............ H04L 67/06 709/217 |

(56) References Cited

U.S. PATENT DOCUMENTS

FOREIGN PATENT DOCUMENTS

| | | |
|---|---|---|
| KR | 10-2011-0069061 A | 6/2011 |
| KR | 10-1148486 B1 | 5/2012 |
| KR | 10-2013-0032019 A | 4/2013 |
| WO | WO 2008/000894 A1 | 1/2008 |
| WO | WO 2010/028365 | 3/2010 |

OTHER PUBLICATIONS

U.S. Appl. No. 14/512,776, filed Oct. 13, 2014, Kitazato.
U.S. Appl. No. 14/566,574, filed Dec. 10, 2014, Fay.
U.S. Appl. No. 14/584,875, filed Dec. 29, 2014, Eyer.
U.S. Appl. No. 14/626,216, filed Feb. 19, 2015, Kitazato.
U.S. Appl. No. 14/659,245, filed Mar. 16, 2015, Yamagishi.
U.S. Appl. No. 14/680,752, filed Apr. 7, 2015, Eyer.
International Search Report and Written Opinion dated Jul. 9, 2014 in PCT/US14/40870.
Office Action dated Sep. 20, 2016 in Korean Patent Application No. 10-2015-7034344 (with English translation).
Office Action dated Mar. 30, 2017 in Korean Patent Application No. 10-2015-7034344 (with English translation).
Extended European Search Report dated Jan. 23, 2017 in Patent Application No. 14819667.8.
Office Action dated Oct. 18, 2016 in Canadian Patent Application No. 2,913,985.
Office Action dated Jul. 28, 2017 in Korean Patent Application No. 10-2015-7034344 (with English language translation).

\* cited by examiner

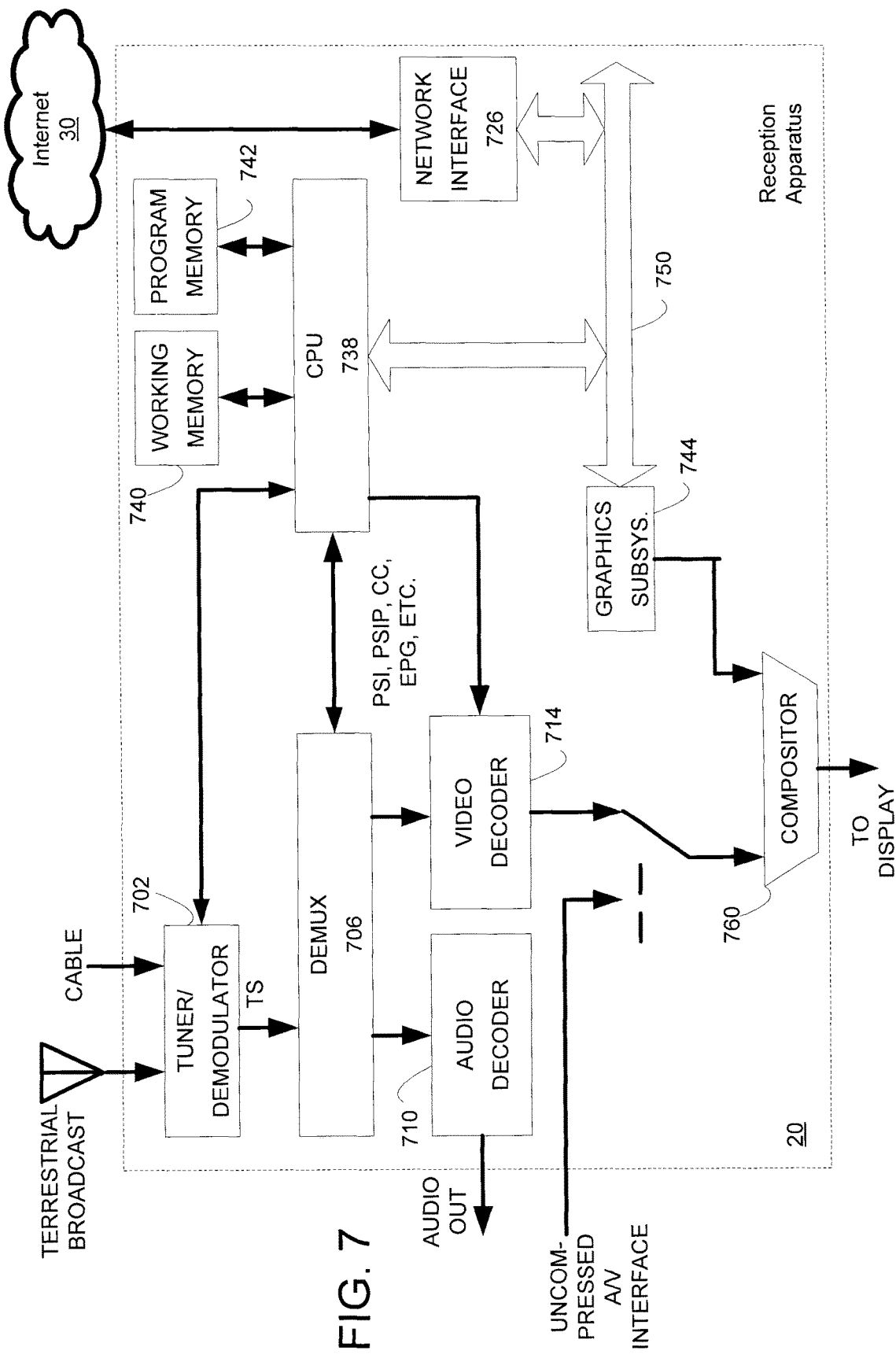

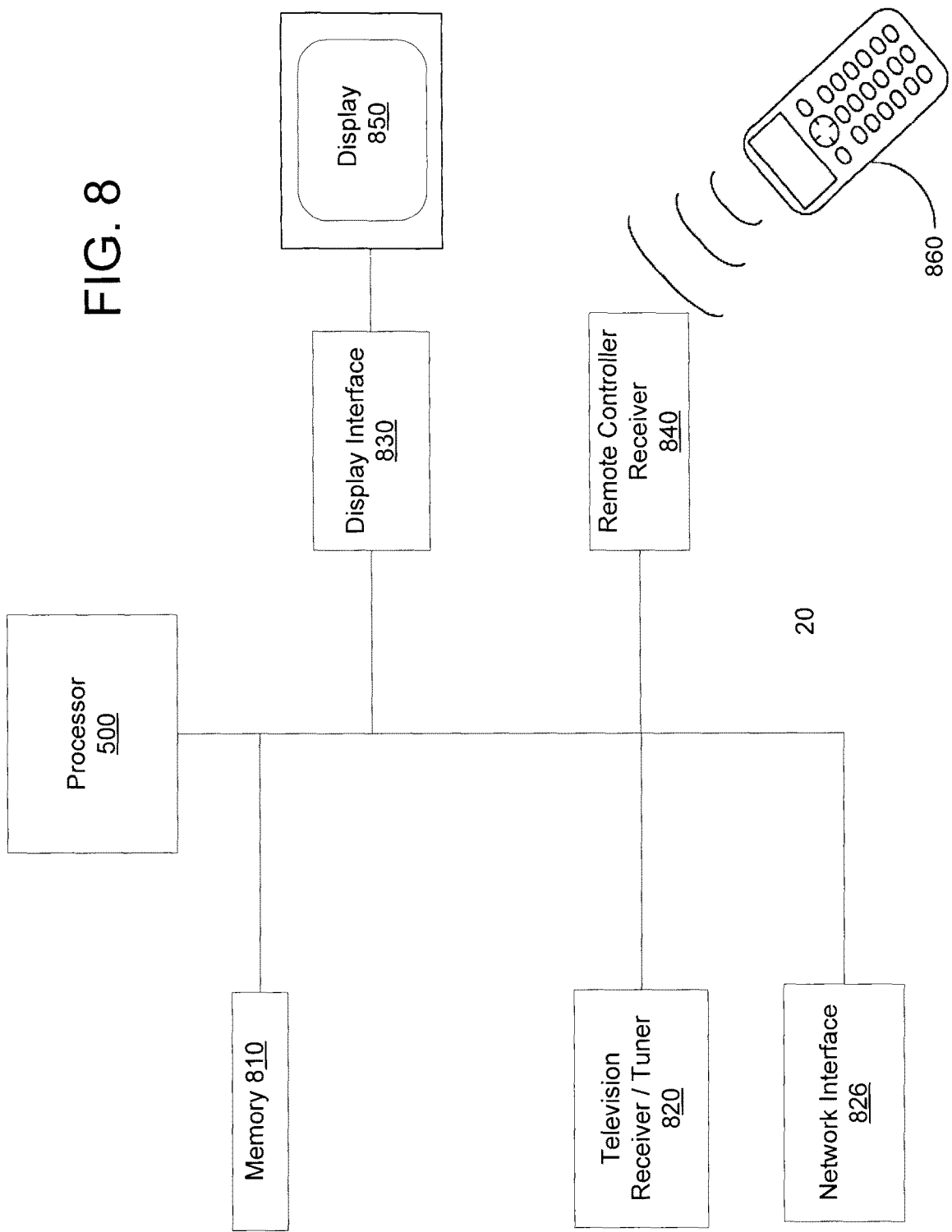

| IP Header | 00000 Sym 1 | 00000 Sym 2 | 00000 Sym 3 | 00000 Sym 4 | 00000 Sym 5 | 00000 Sym 6 | ... |

FIG. 11A

| IP Header | Sym 1, 2, 3 | Sym 3, 4, 5, 6 | Sym 6, 7, 8 | Sym 9, 10, 11 | Sym 11, 12, 13, 14 | Sym 14, 15, 16 | ... |

FIG. 11B

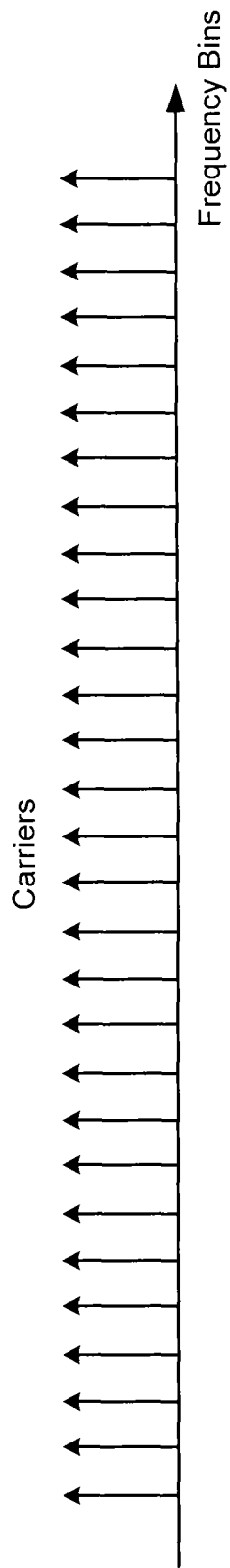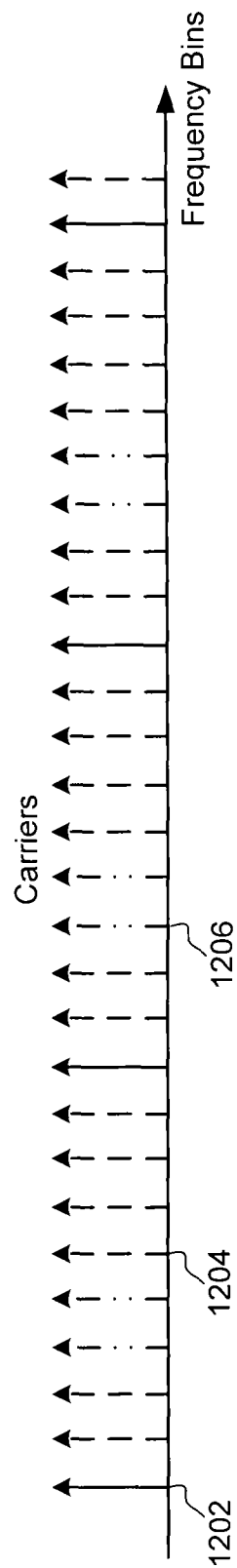

METHODS, INFORMATION PROVIDING SYSTEM, AND RECEPTION APPARATUS FOR DISTRIBUTION OF AT LEAST ONE CONTENT VERSION

CROSS-REFERENCE TO RELATED APPLICATIONS

This application is a continuation of U.S. application Ser. No. 13/934,549 filed Jul. 3, 2013, the entire content of which is incorporated herein by reference.

BACKGROUND OF THE INVENTION

Field of the Invention

Embodiments described herein relate generally to distributing at least one version of content.

Background

Modern televisions and set top boxes are capable of receiving broadcast television services. These broadcast television services are broadcast by broadcast providers and only intended for free consumption by the general public. Satellite and cable providers typically pay fees to retransmit the broadcaster signals on their own respective systems. However, certain entities are taking broadcaster signals and re-transmitting them without paying retransmission fees.

SUMMARY OF THE INVENTION

Embodiments of the present disclosure relate to addressing the problem of unauthorized re-transmission of broadcast signals. Although the present disclosure is primarily described with respect to the re-transmission of broadcast signals, the embodiments can be applied to content distributed via any other transmission media/scheme such as cable, satellite, radio, a mobile network, the Internet, etc.

Further, certain embodiments use radio frequency (RF) modulation and signaling to protect signals which can be sent over another communication path such as the Internet, for example to address the above-noted problems. When used in combination with RF signaling, further options open up for a broadcaster to send protected content.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is a block diagram of an exemplary reception apparatus;

FIG. 8 is a processor-centric block diagram of an exemplary reception apparatus;

FIGS. 11A and 11B illustrate exemplary Internet Protocol (IP) data packets;

FIGS. 12A and 12B illustrate exemplary carriers;

DETAILED DESCRIPTION

Figure 1:
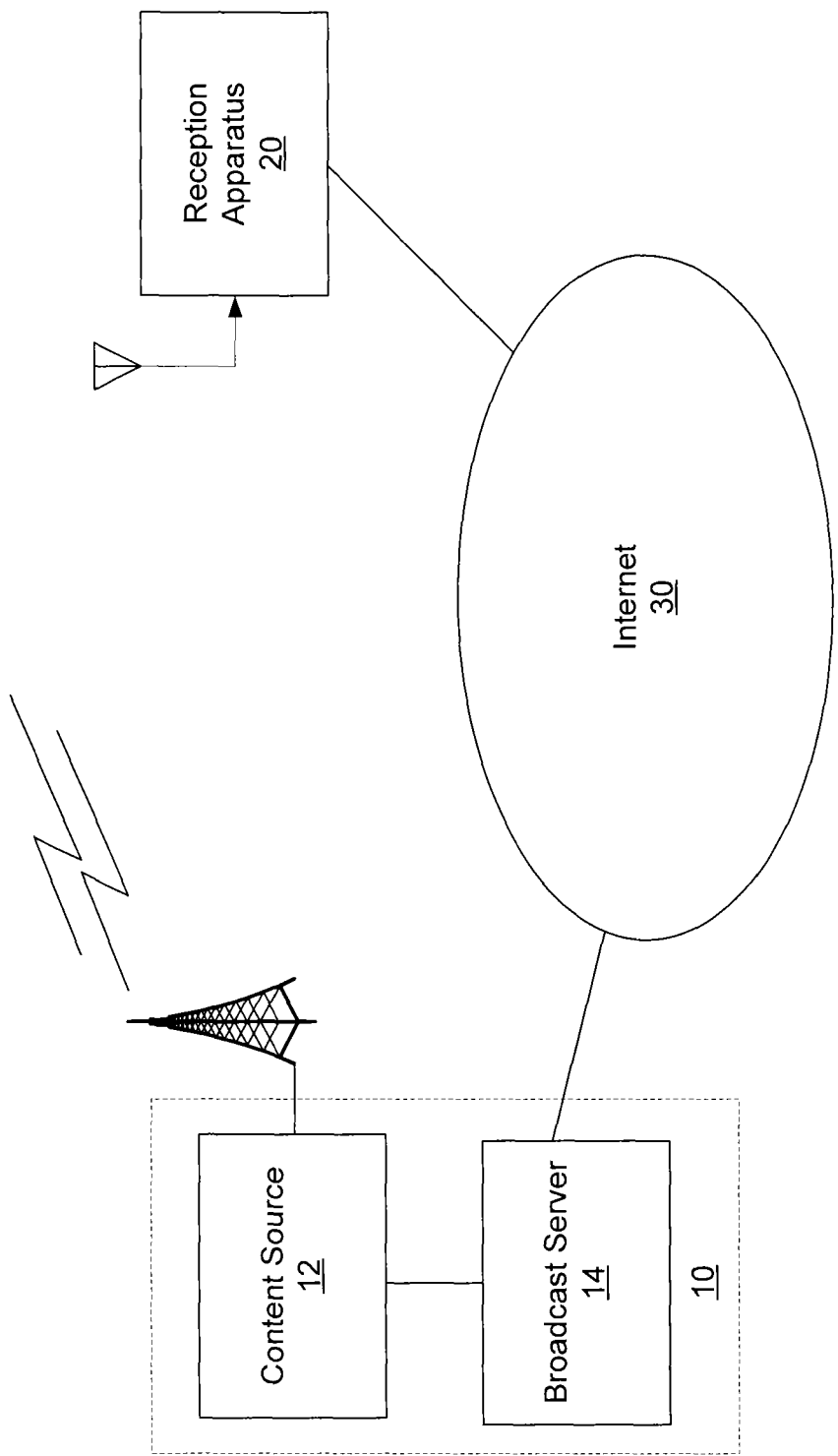
FIG. 1 illustrates an exemplary broadcast system.

While the present disclosure is susceptible of embodiment in many different forms, there is shown in the drawings and will herein be described in detail specific embodiments, with the understanding that the present disclosure of such embodiments is to be considered as an example of the principles and not intended to limit the present disclosure to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio/video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an EPG.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Embodiments of the present disclosure relate to providing at least one version of content. The certain embodiments, different portions of the at least one content version are provided over a plurality of different communication paths. In another embodiment, all portions of the at least one content version is provided on a single communication path (e.g., a non-terrestrial broadcast channel).

In certain embodiments, radio frequency (RF) signal levels are quantized into byte form and an IP packet header is loaded onto a series of RF quantized values (e.g., bytes) and sent out. Receivers pick up the RF stream from a non-terrestrial broadcast channel (e.g., the Internet) in a manner similar to an antenna.

For security reasons, this method could be applied to protect broadcasters' content from re-transmission as multiple forms of transmission (e.g., RF and the Internet) could be used in a split manner and both connections would be needed to correctly recover at least one version of content or, in certain embodiments, any content. For example, symbols could be split up where a portion goes to the Internet. This would enable licensing content to users for broadcaster protection as users would need an Internet connection to recover the full content.

Further, the IP packets could be encrypted while keeping the broadcast content unencrypted to enable Digital Rights Management (DRM), conditional access, or other forms of controlled access, of all or at least one version of content. The split could be 50/50 or any other distribution to reduce the load on the Internet.

Packet latency needs to be taken into account when different portions of at least one content version are provided over a plurality of different communication paths. For example, buffer models could be setup to capture an entire frame before processing the data thereby allowing elastic buffers of the Internet packets to have time to reach users and receivers to correctly receive all packets before processing the signals. Buffer models could be utilized, in one example when only 10% of the packets go to the Internet. This could be applied to any transmission scheme, and for orthogonal-frequency-division multiplexing (OFDM) even certain carriers could be selected for different physical communication paths (e.g., RF transmission or Internet).

Internet connectivity continues to grow and has become available to more and more users. While the Internet is becoming robust and reliable, broadcast signals are not very robust or reliable today. Accordingly, certain embodiments of the present disclosure utilize the Internet as another channel type for providing at least a portion of content. Hybrid television (i.e., television that is capable of accessing a television broadcast and the Internet) is available but content provided to existing systems have limited protection (e.g., Digital Rights Management (DRM) rights).

Most users are connected to the Internet already and services are now beginning to leverage that capability. In certain embodiments, broadcasters can transmit content data, or any other services, over one or more non-terrestrial broadcast channels in its entirety or in pieces while having their content fully protected.

Although embodiments of the present disclosure are primarily described using television broadcasts as an example, it should be noted that the embodiments can also be applied to radio, long-term evolution (LTE) networks, white-space devices, or anything which could use both RF signals and non-RF communication paths (e.g., Internet connections).

FIG. 1 illustrates an exemplary broadcast system 2, which includes an information providing system 10 and a reception apparatus 20 (e.g., a digital television receiver device) connected to each other via one or more communication networks such as the Internet 30. The information providing system 10 is associated with a service provider (e.g., a television broadcaster) that provides services, including content such as television programs.

The information providing system 10 includes a content source 12 and a broadcast server 14. Although FIG. 1 illustrates one information providing system 10, one content source 12, one broadcast server 14, and one reception apparatus 20, it should be understood that any number of each may be included in the broadcast system 2.

According to certain embodiments of the present disclosure, the information providing system 10 splits content data, associated with at least one version of content, for transmission over a plurality of different communication paths. In other embodiments, all portions of the content data are provided on a non-terrestrial broadcast channel.

The content data is split between two channel types (i.e., physical communication paths) such as a terrestrial broadcast channel and the Internet. For example, the content data portions are split and transmitted in a digital television broadcast signal and one or more IP data packets.

The content data can be split according to one or a combination of different factors. One factor is whether one or more content versions must be receivable via a single communication path. Other factors are the type of modulation scheme used to generate the digital television broadcast signal and compatibility requirements with any legacy devices. Examples of splitting content data include by virtual channels (same content in SDTV vs. HDTV), parsing out individual carriers of an OFDM-type modulation, and sending FEC protection bytes over the Internet and the data via a terrestrial broadcast. In other embodiments, the splitting can be performed at the application layer. For example, in a transmission control protocol (TCP) type of communication where a transmitter asks for acknowledgement of reception (handshaking) or splitting the same content to different paths. For example, using Scalable Video Coding (SVC), a 4K video base layer can fit into a 6 MHz channel on a first communication path and the content is scaled to increase it up to 8K video. The scaling content could be sent via a second communication path. In another example, an 8K video encoder output is split (e.g., even/odd) in terms of packet outputs (e.g., first packet to terrestrial, second packet to Internet, third packet to terrestrial, etc.)

For example, when one or more content versions must be receivable via a single communication path (e.g., a terrestrial broadcast channel), at least a portion of the content data associated with the one or more content versions is provided on the single communication path. At least one other communication path carries a portion of the content data associated with all or part of a different content version.

The content versions differ from each other in one or more ways. Differences include, for example, video quality (e.g., standard-definition versus high-definition television, high-definition versus ultra-high-definition television), audio quality (e.g., stereo versus 5.1 audio), interactivity (e.g., interactive versus non-interactive), service levels (e.g., broadcaster supported features, hyperlinks, access to further information from the broadcaster), etc.

Television broadcasters are currently required to broadcast content in the clear, as mandated by Congress. However, the mandate only requires clear standard-definition (SD) content. Accordingly, in certain embodiments, an SD content version is broadcast on a terrestrial broadcast channel while a different version of the same content is provided over a different communication path (e.g., the Internet 30). The different version of the same content could be independent of the SD content version or a layer to be added to the SD content version, for example in the case of scalable video. It should be noted that a portion of the different content version may be provided on the terrestrial broadcast channel.

The transmission of different portions of content data over a plurality of different physical communication paths allows a broadcaster to optionally protect at least a portion of their transmission while keeping the broadcasted content data portion in the clear (e.g., unencrypted). For example, the content data is split and the portion provided over the Internet is optionally further protected to prevent unauthorized access. In other embodiments, the broadcasted content data portion or a combination of the broadcasted content data portion and the content data portion provided over the Internet are protected.

The reception apparatus 20 receives the transmitted digital television broadcast signal and the one or more IP data packets. The reception apparatus 20 only presents content using a content data portion carried in the digital television broadcast signal when, for example, the reception apparatus 20 is a legacy device that does not support split content, or the reception apparatus 20 does not have access to another communication path. In this case, the reception apparatus 20 only presents the content to the user when one or more complete content versions is transmitted in the digital television broadcast signal.

When the reception apparatus 20 supports split content, and has access to content data portions provided via a plurality of different communication paths, the reception apparatus 20 is configured to combine the various content data portions to present one or more content versions.

Further, when a content data portion is protected to prevent unauthorized access, in one embodiment, the reception apparatus 1 retrieves security information needed to access (e.g., descramble or otherwise decode) the protected content data portion. The security information is provided in a manner that does not interfere with the operation of legacy devices. For example, the security information is included in a data field sync segment or provided using other methods, as described further below.

Depending on the embodiment, the reception apparatus 20 either processes the content data portion acquired from a single communication path (e.g., the Internet 30) for direct presentation to the user or combines content data portions from a plurality of communication paths prior to presentation to the user. For example, according to one embodiment, a first content data portion is provided via a terrestrial broadcast channel that contains Standard-Definition Television (SDTV) content which is freely received and decoded by any broadcast receiver. A second content portion is provided via the Internet 30 that contains High-Definition Television (HDTV) content and is only receivable and/or accessible by broadcast receivers that support split content.

The reception apparatus 20 displays decoded video data on a display device (e.g., a liquid crystal, organic light-emitting diode, active matrix organic light-emitting diode, or plasma display) and outputs decoded audio data through an audio system.

Figure 2:
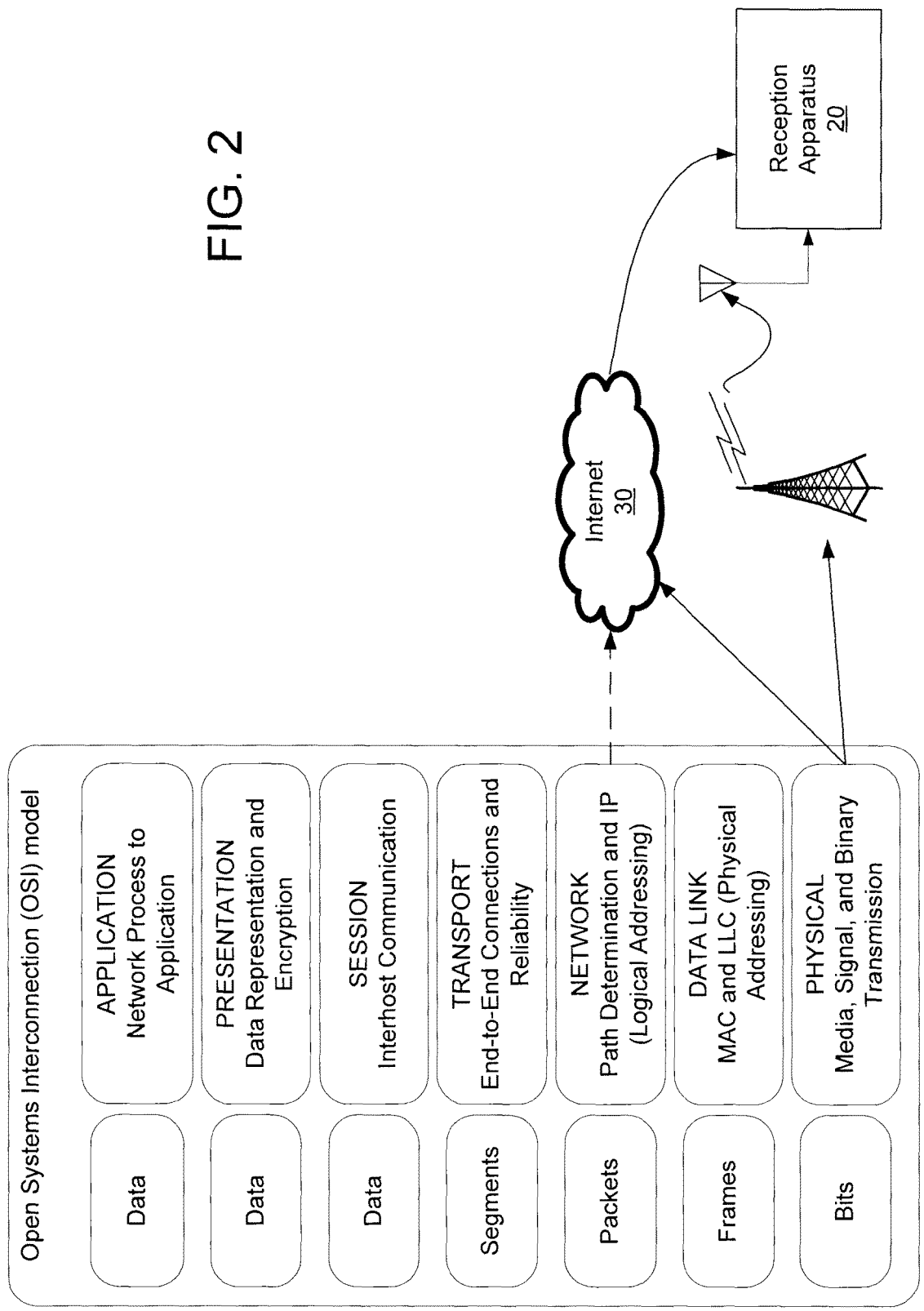
FIG. 2 illustrates an example of the broadcast system providing content data.

FIG. 2 illustrates an example of the split content transmission by the broadcast system 2. In FIG. 2, a digital television pre-broadcast signal, carrying content data of at least one content version, is parsed out in the physical layer such that different portions of the content data are transmitted over a terrestrial broadcast channel and the Internet 30. Packets utilized by current hybrid television technologies, for example to interface with the Internet for browsing and viewing content, are also optionally provided via the Internet 30.

In certain embodiments, the splitting occurs in the physical layer such that, for example, carriers or pieces of the RF signal waveform (or the RF signal waveform in its entirety) are parsed out, an IP header is tacked on to a series of RF valued bytes (possibly 187 byte lengths) and sent down the Internet 30. For example, the physical layer takes IP packets or an MPEG Transport Stream (TS), or any kind of data formats, encodes, protects, signals, modulates, filters, and sends it out as a RF signal for transmission over the air.

In other embodiments, the IP packets are parsed before they go to the physical layer and that information is sent out to the Internet. For example, in current hybrid television the Internet and broadcast content are sent out in parallel. However, IP packets are nothing but a selected amount of bytes stuffed into a "packet" and then further bytes are appended as a header to tell where the packet is from and where it is going. The data in the packets are bytes which are 8-bit values. Those values could correspond to an RF level, not necessarily data. So, in certain embodiments, the physical layer is run as always, with its signal protection, coding, signaling, modulations, and other preparations and then the output is taken, which for 8-VSB transmissions are the values (−7, −5, −3, −1, 1, 3, 5, 7) and packaged as bytes into an IP packet.

Figure 3:
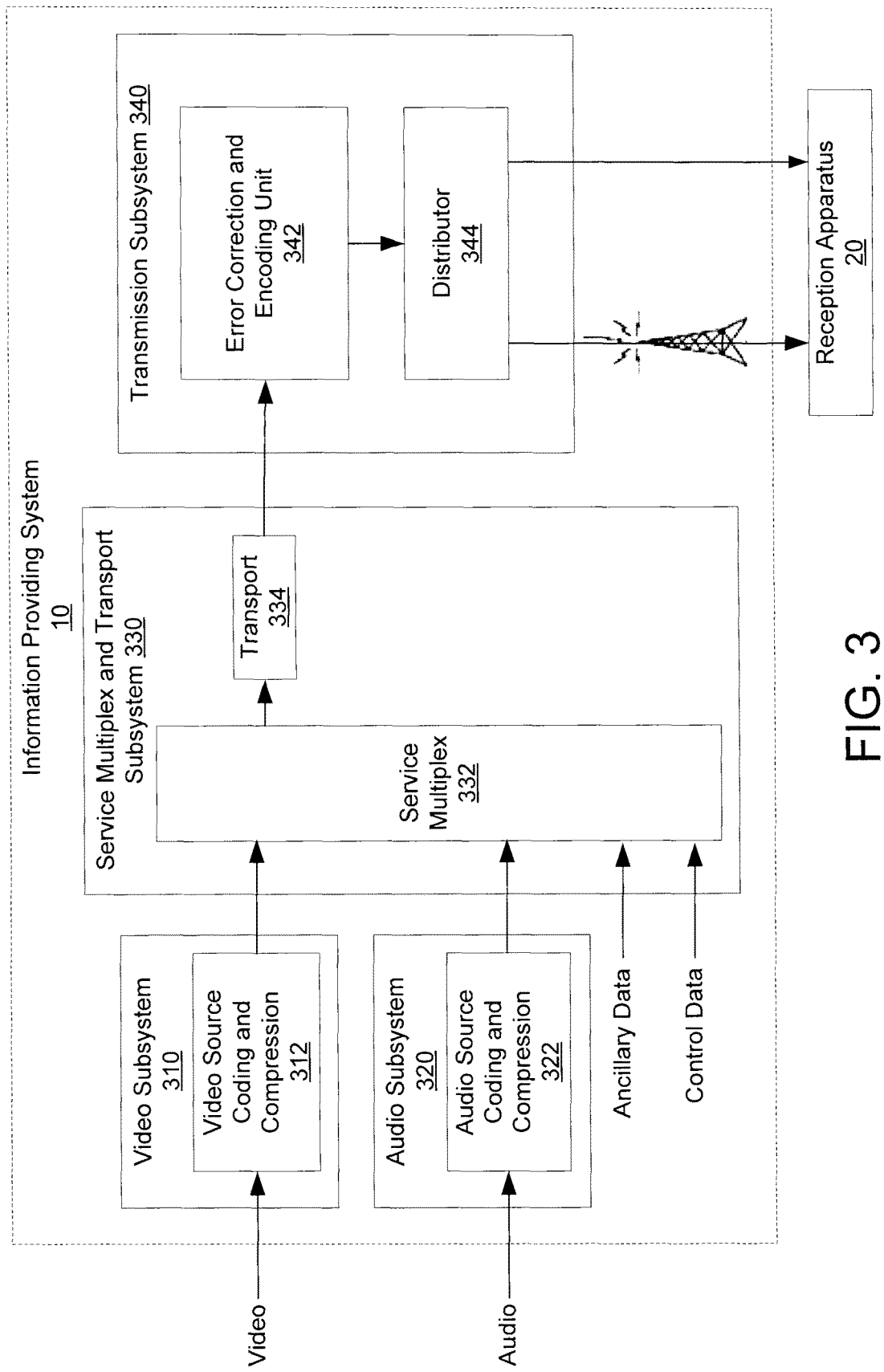
FIG. 3 is a block diagram of an exemplary information providing system.

FIG. 3 is a block diagram of an embodiment of the information providing system 10. The information providing system 10 includes a video subsystem 310, an audio subsystem 320, a service multiplex and transport subsystem 330, and a transmission subsystem 340. The video and audio subsystems 310, 320 are combined into a single subsystem in one embodiment.

The video subsystem 310 includes a video source coding and compression unit 312 and the audio subsystem 320 includes an audio source coding and compression unit 322. Each of the video and audio source coding and compression units 312, 322, includes at least one encoder configured to compress content. The one or more audio and video encoders output audio and video data streams in accordance with one or more predetermined coding methods such as MPEG-2, MPEG-4, etc. In certain embodiments, the audio and video data stream correspond to one or more versions of the same content.

The service multiplex and transport subsystem 330 includes a service multiplex unit 332 and a transport unit 334. The service multiplex unit 332 generates content data, which contains the audio and video data streams, and a TS that includes the content data, ancillary data, and control data. The transport unit 334 that forwards the TS to the transmission subsystem 340.

The transmission subsystem 340 includes an error correction and encoding unit 342 and a distributor 344. The distributor 344 is configured to generate a digital television broadcast signal according to any one or a combination of modulation modes such as 8-VSB and OFDM-based modulation modes and one or more IP data packets.

Figure 4:
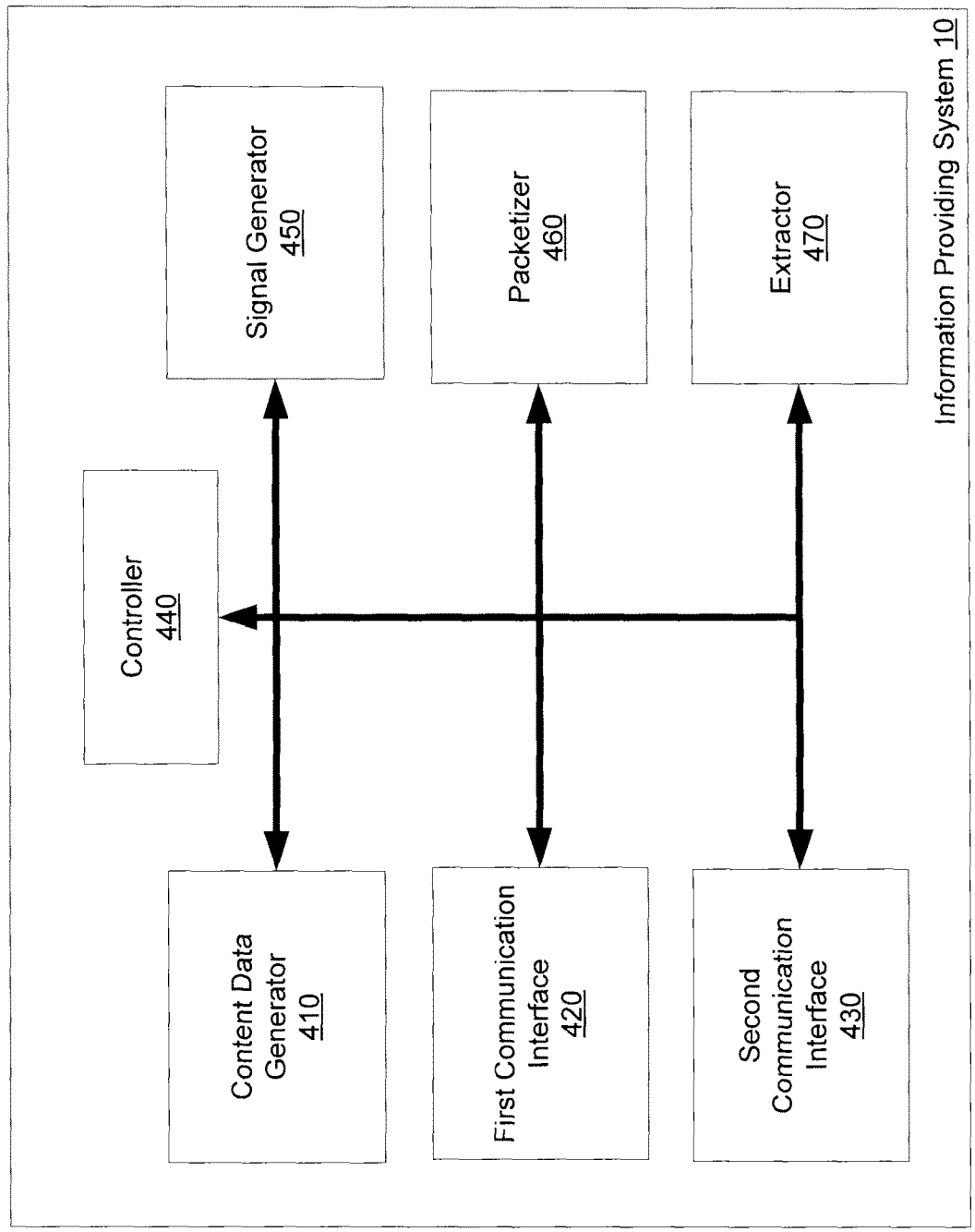
FIG. 4 is another block diagram of an exemplary information providing system.

FIG. 4 is another block diagram of the information providing system 10. This system 10 includes a content data generator 410, a first communication interface 420, a second communication interface 430, a controller 440, a signal generator 450, a packetizer 460, and an extractor 470. The controller 440 controls the operation of the various components of the information providing system 10.

The content data generator 410 generates content data associated with at least one version of content. The content data is subsequently processed by the signal generator 450 to generate an RF signal (e.g., a digital television broadcast signal). The extractor 470 extracts a portion of the content data from a pre-broadcast RF signal at any point after the content data is generated by the content data generator 410 and before the signal generator 450 completes generation of the RF signal. The packetizer 460 receives the extracted portion of the content data and generates one or more IP data packets.

The first and second communication interfaces 420, 430 distribute the RF signal and the one or more IP data packets, respectively. The first communication interface 420 can be implemented using any one or a combination of a terrestrial broadcast transmitter, a cable broadcast transmitter, and a satellite uplink transmitter. The second communication interface 430 is a network interface such as a wireless local area network card, Ethernet card, etc. that interfaces with a communication network.

Figure 5A:
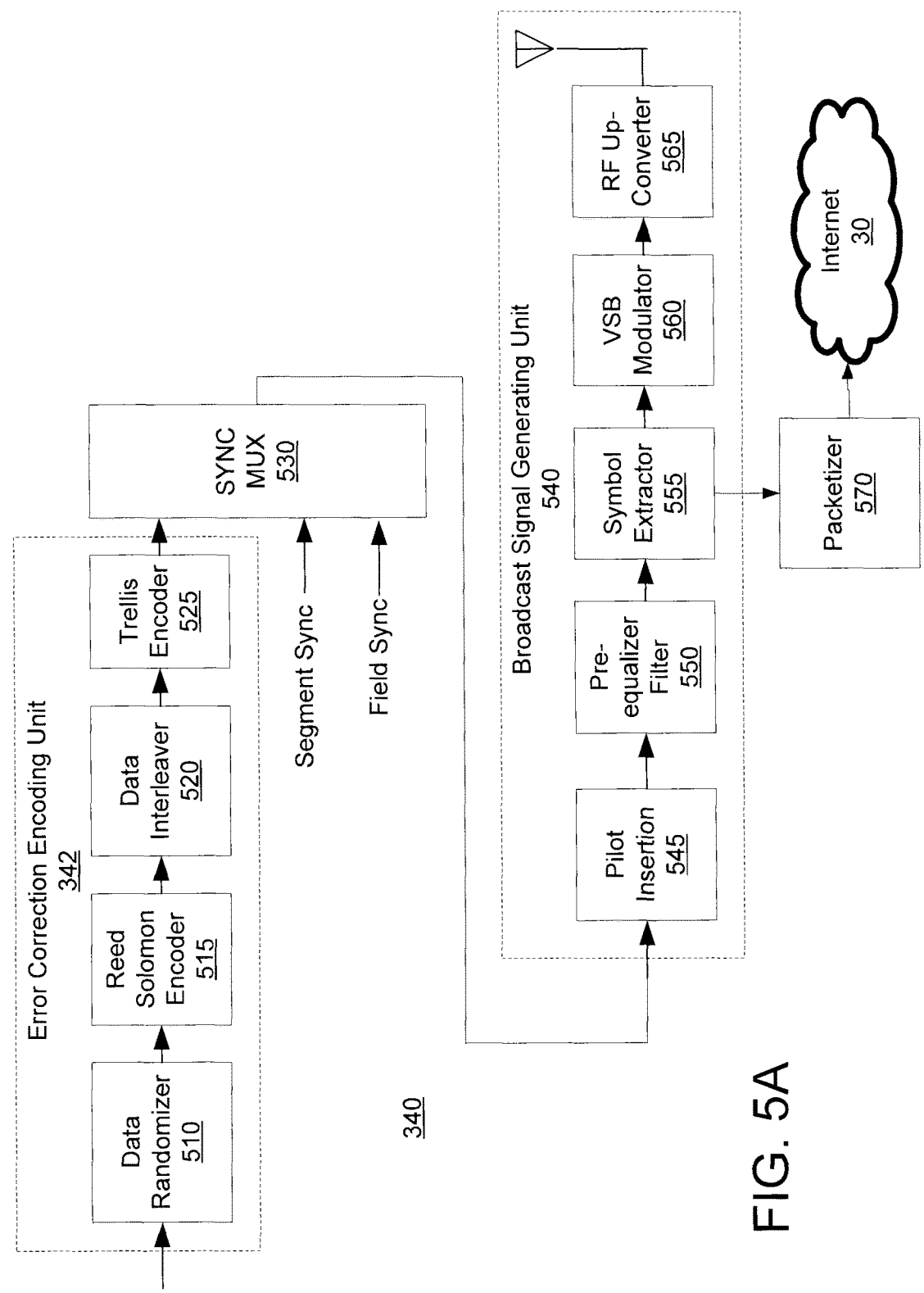
FIG. 5A is a block diagram of an exemplary vestigial sideband (VSB) transmission system.

FIG. 5A illustrates one embodiment of the transmission subsystem 340. In this embodiment configured in accordance with ATSC standard A/53, which is incorporated herein by reference in its entirety.

The error correction encoding unit 342 contains a data randomizer 510, a Reed Solomon (RS) encoder 515, a data interleaver 520, and a trellis encoder 525. The error correction encoding unit 342 is used to perform error correction encoding on the content data prior to the sync mux 530 multiplexing the content data with synchronization signals (e.g., segment sync and/or field sync signals).

Specifically, the data randomizer 510 randomizes the incoming data. The RS encoder 515 processes the randomized data for forward error correction (FEC) in the form of RS coding. The data interleaver 520 performs data field interleaving to scramble the sequential order of the data stream and assemble data packets, and the trellis encoder 525 performs trellis coding on the assembled data packets. The sync mux 530 adds data segment and field syncs.

Figure 15:
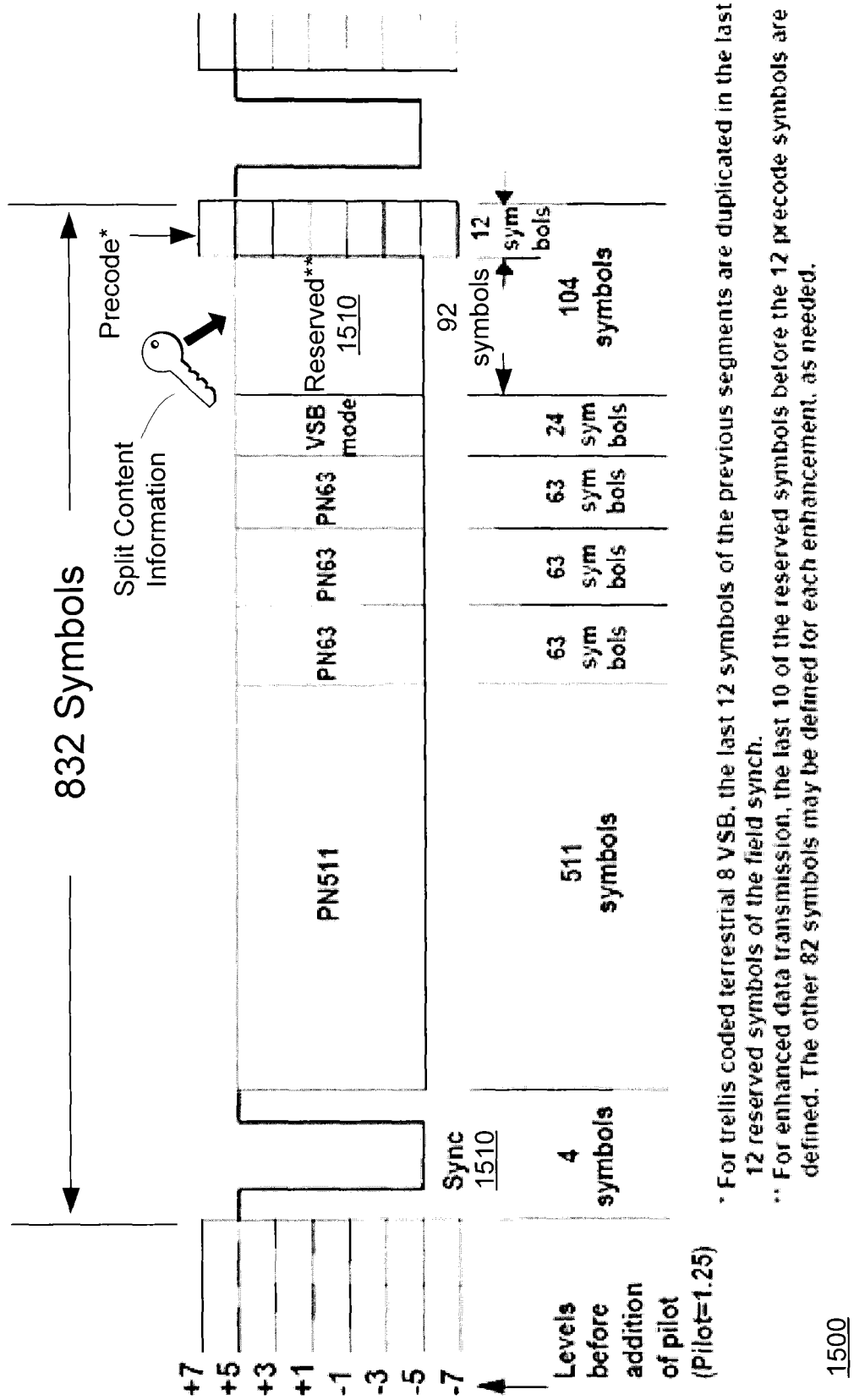
FIG. 15 is a diagram of an exemplary data field sync segment.

In one embodiment, the sync mux 530 inserts split content information, which includes at least one of information identifying the content data as split content, location information used by the reception apparatus 20 to access any content data portions to be provided on one or more communication paths (e.g., an IP address), and security information needed to access such content data portions. A data field sync segment 1500 is illustrated in FIG. 15 and includes a 4 symbol data segment sync, a 511 symbol pseudo-random sequence, three 63 symbol pseudo-random sequences, a 24 symbol VSB modulation mode, 92 symbols that are reserved 1510, and 12 symbols of precode. According to an embodiment of the present disclosure, the split content information is embedded into the transmission by using the reserved portion 1510 of the data field sync segment 1500 illustrated in FIG. 15.

Certain embodiments of the present disclosure insert at least a portion of the split content information in the 92 symbol reserved portion 1510 and/or the 12 symbol precode portion. For example, when one or more enhanced data transmission methods are used, the reserved symbols and precode symbols are numbered 1 to 104 with the 12 precode symbols being preceded by 10 symbols that are used to signal the presence of the enhancement or enhancements. In this case, the split content information is inserted in one or more of the 82 remaining symbols.

The RF signal synchronization information is typically thrown away after a correlation peak is found. By inserting split content information in the reserved portion 1510 of the data field sync segment, the split content information can be recovered by a receiving demodulator to reconstruct the content data from a plurality of communication paths. Further, inserting the split content information in a piece of the RF signal being thrown away by legacy receives allows new receivers to pick up the split content information and protect content without breaking the legacy receivers.

The broadcast signal generating unit 540 includes a pilot insertion unit 545, an optional pre-equalizer filter 550, a vestigial sideband (VSB) modulator 560, and a RF up-converter 565, which are configured to generate a digital television broadcast signal in accordance with ATSC standard A/53.

Figure 5B:
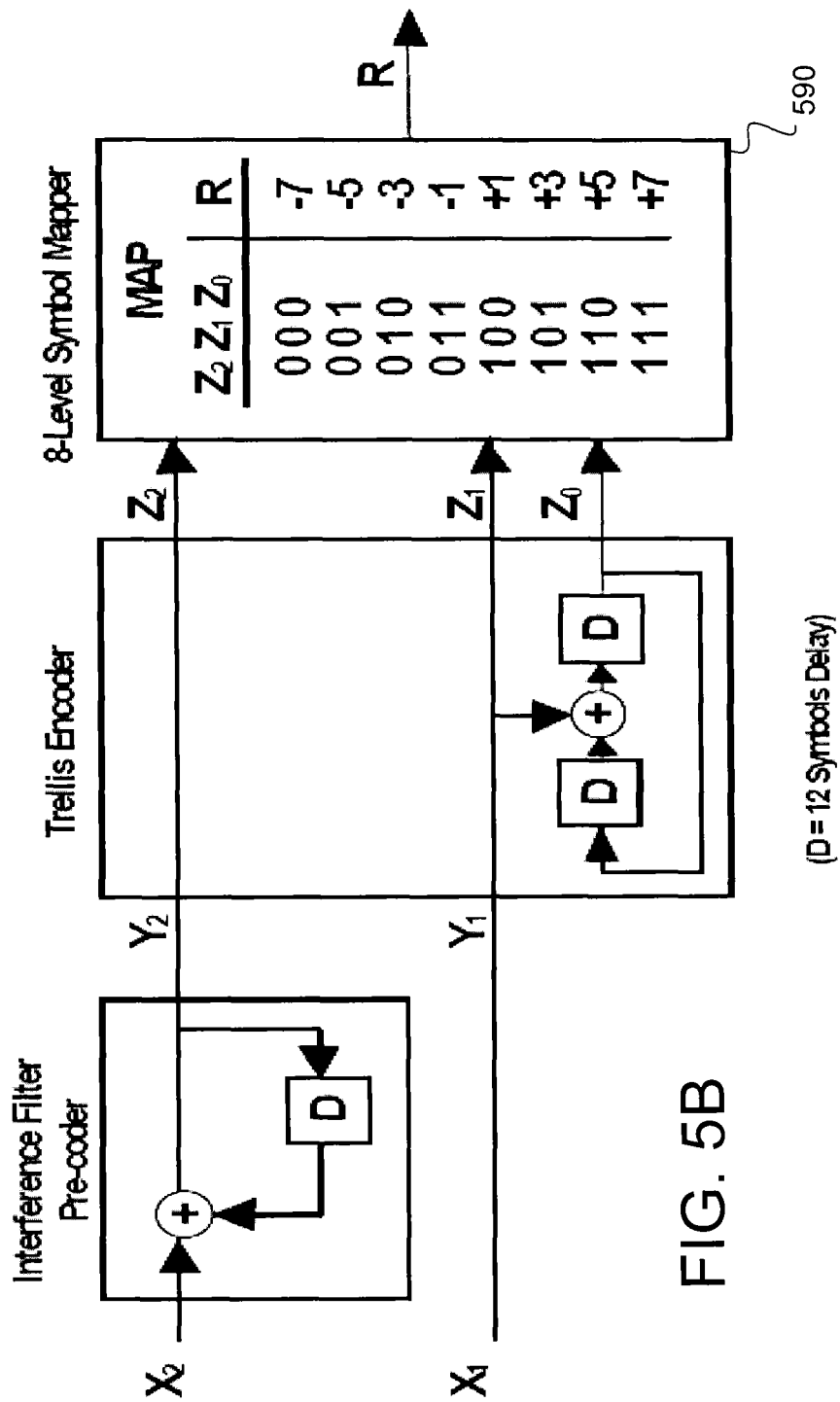
FIG. 5B is a block diagram of an exemplary symbol mapper.

The RF up-converter 565 takes the baseband signal and shifts it up into a designated RF channel depending on a broadcaster's license. The VSB modulator 560 takes the symbols generated from a mapper 590 illustrated in FIG. 5B, which is a more detailed illustration of the trellis encoder 525, and modulates them into an RF signal which entails taking on the real part of the baseband symbols and VSB filtering those real parts. The pre-equalizer filter 550 is optional, the heart of the symbols input into the VSB modulator are the symbols from the mapper 590.

According to certain embodiments of the present disclosure, the broadcast signal generating unit 540 further includes a symbol extractor 555. The symbol extractor 555 is configured to extract one or more symbols to be provided via at least one different physical communication path (e.g., the Internet 30). In one embodiment, a packetizer 570 packages the extracted one or more symbols into one of more IP data packets for transmission over the Internet 30. The extracted one or more symbols may be removed from the output to the VSB modulator 560 or replaced with other values, for example to keep bit rates constant for odd splitting of data. For example, other values such as PRBS streams could be output to the VSB modulator 560 to replace the extracted one or more symbols.

Figure 6A:
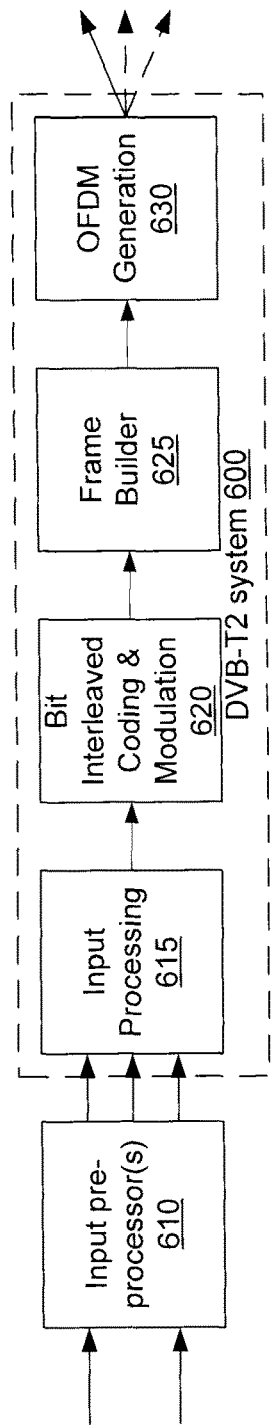
FIG. 6A is a block diagram of an exemplary orthogonal-frequency-division multiplexing (OFDM) transmission system.
Figure 6B:
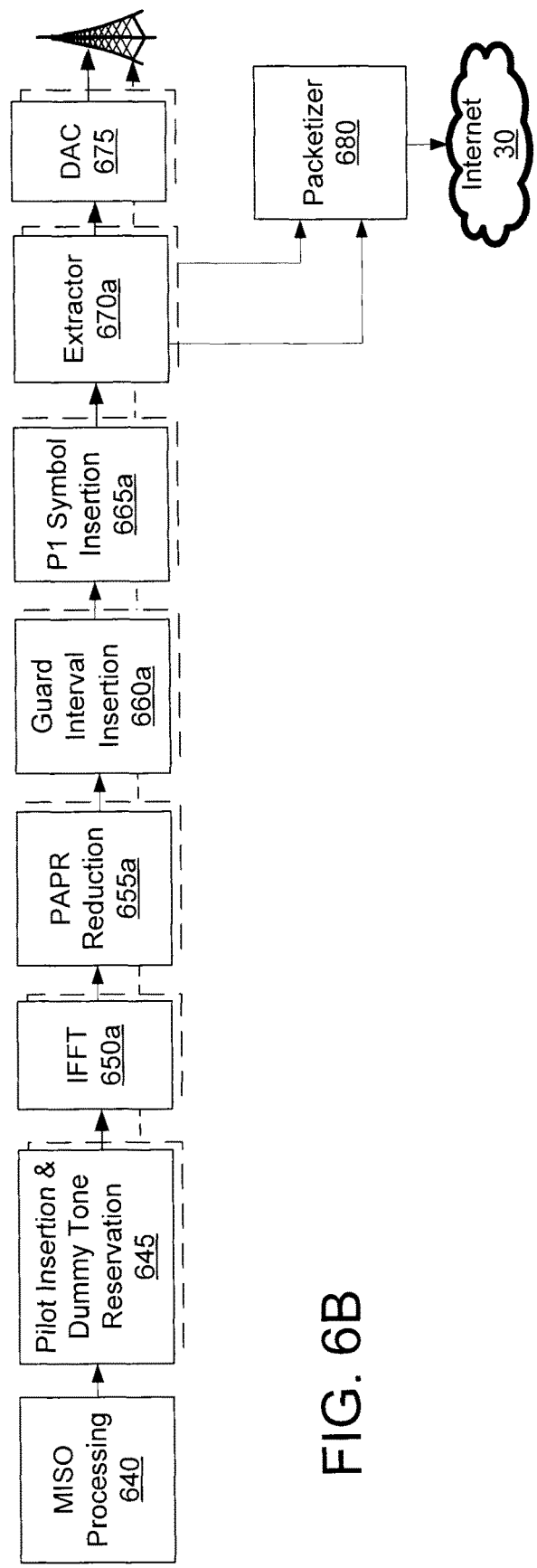
FIG. 6B is an exemplary block diagram of the OFDM generation block.

FIGS. 6A-6B illustrate another embodiment of the transmission subsystem 340. In this embodiment, an OFDM-based transmission system in which symbols or even certain carriers could be selected for different communication paths (e.g., RF transmission and the Internet).

FIG. 6A illustrates an exemplary Digital Video Broadcasting—Second Generation Terrestrial (DVB-T2) system 600. A pre-processor(s) 610 processes one or more MPEG-2 Transport Stream(s) and/or one or more Generic Stream(s) for output to the DVB-T2 system 600, which includes input processing block 615, bit interleaved coding & modulation block 620, frame builder 625, and OFDM generation block 630. The DVB-T2 system 600 is described for example in Digital Video Broadcasting Document A122, which is incorporated herein by reference in its entirety. The DVB-T2 system 600 outputs at least one signal to be transmitted on a signal RF channel.

Figure 6C:
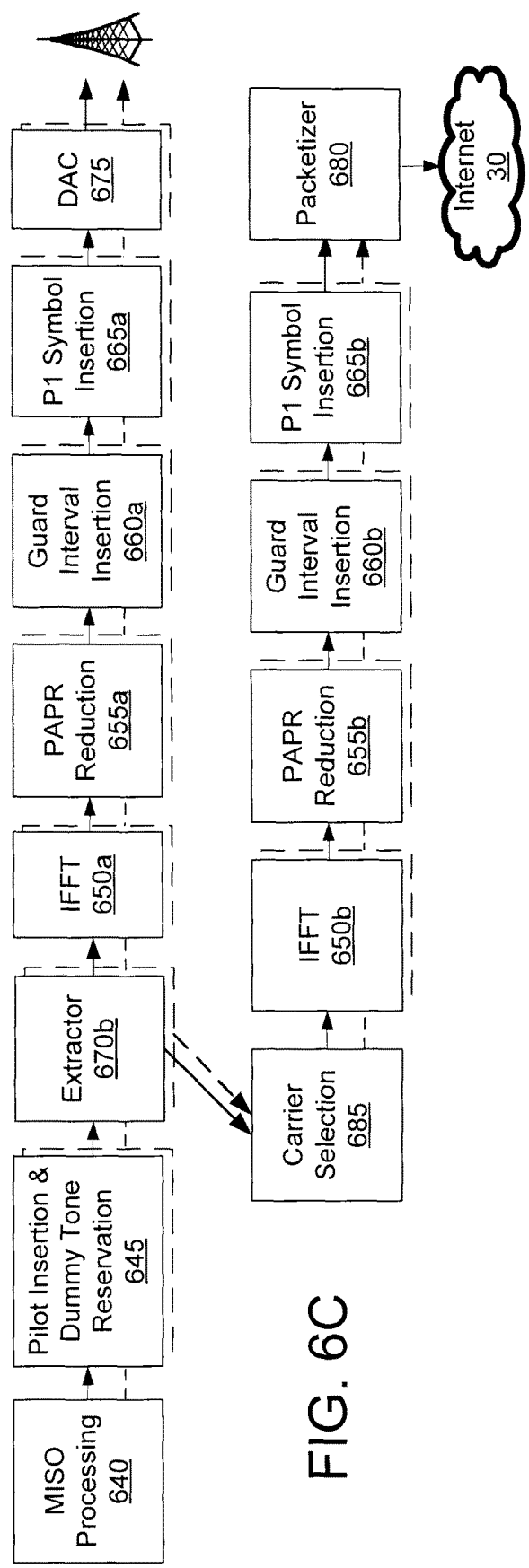
FIG. 6C is another exemplary block diagram of the OFDM generation block.

FIGS. 6B-6C are more detailed illustrations of the OFDM generation block 630 according to different embodiments of the present disclosure. As illustrated in both figures, the OFDM generation block 630 includes multiple-input single-output (MISO) processing block 640, pilot insertion & dummy tone reservation block 645, inverse Fast Fourier Transform (IFFT) block 650a, peak-to-average power ratio (PAPR) reduction block 655a, guard interval insertion block 660a, P1 symbol insertion block 665a, and digital-to-analog converter (DAC) block 675.

The input for DAC block 675 is modulated symbols. In one embodiment, these symbols are processed by extractor block 670a, and packaged by the packetizer 680 to create one more IP data packets. An example is illustrated in FIG. 6B. The extractor block 670a removes or replaces the symbols output to the DAC 675.

In other embodiments, the output from any other block within the OFDM generation block 630, or within the other blocks 610, 615, 620, 625, could be used to generate the one more IP data packets. For example, as illustrated in FIG. 6C, an output before the IFFT block 650a could be processed by extractor block 670b to separate out carriers designated for different communication paths (e.g., the Internet and terrestrial broadcast channel).

The extractor block 670b either (1) removes one or more carriers to have a lower order FFT or (2) fills the one or more carriers with PRBS streams. An advantage of using a lower order FFT would be an increase in reception for mobile devices as more noise could be tolerated. The percentage of removal could be variable, for example the removal could be performed according to a suitable FFT size (e.g., a power of 2).

IFFT block inputs are series of carriers as illustrated in FIG. 12A. Some carriers are pilot tones for channel correction and some are data carriers to carry QAM-modulated symbols. In DVB-T2, the modulation formats are QPSK, 16QAM, 64QAM, and 256QAM. This means there could be 2-bit, 4-bit, 6-bit, or even 8-bit symbols. The pattern of pilots to data carriers is selectable, and for the IP packet creation, in one embodiment, only data carriers should be selected. An exemplary selection is illustrated in FIG. 12B, in which the solid arrows 1202 correspond to pilot tones, the dashed arrows 1204 correspond to data carriers for terrestrial broadcast, and the dashed-dotted arrows 1206 correspond to data carriers for Internet transmission.

As illustrated in FIGS. 6B-6C, there are two paths for transmission. A first content data portion is provided in a OFDM-based digital television broadcast signal while a second content data portion is provided via another communication path (e.g., the Internet 30). Such an arrangement gives, for example, an even more robust form of content protection to the broadcasters. The data rates will vary depending on which modulation is used for data carriers, but if 256QAM is used 8-bit symbols map easily to 8-bit bytes.

Depending on how many data carriers are selected for Internet transmission, the Internet loading could be adjusted easily by selecting fewer or more carriers for the Internet transmission path. Encrypting of the Internet data as described above can also be applied.

FIG. 7 illustrates an embodiment of the reception apparatus 20. The reception apparatus 20 is a home video processor such as a personal computer, television receiver or DVD recorder, or an information processor such as a Personal Digital Assistant (PDA), mobile phone, tablet, home or portable music player, or home or portable gaming machine. Further, the reception apparatus 20 may be a standalone device or incorporated, for example, in a television set or other consumer electronics device. For example, in one embodiment, the reception apparatus 20 is a digital television receiver device that may be incorporated into a television set or a set top box.

The reception apparatus 20 includes a tuner/demodulator 702, which receives a content data portion from one or more content sources such as a terrestrial broadcast or a cable television transmission (e.g., information providing system 10). The reception apparatus 20 may also, or alternatively, receive a content data portion from a satellite broadcast.

In one embodiment, the tuner/demodulator 702 is configured to extract split content information that includes one or a combination of information identifying the content data as split content, location information used by the reception apparatus 20 to access any content data portions to be provided on one or more other communication paths (e.g., an IP address), and security information needed to access such content data portions, from the television broadcast signal (e.g., from a reserved portion of a data field sync segment), and forward it to CPU 738. Further, in one embodiment, the tuner/demodulator 702 is configured to receive at least one content data portion received via the one or more communication paths to reconstruct a digital television pre-broadcast signal.

In certain embodiments, the tuner/demodulator 702 is configured to combine content data portions provided via different communication paths and output a transport stream (TS). The TS is demultiplexed by a demultiplexer (demux) 706 into audio and video (A/V) streams. In another embodiment, the demux 706 is configured to combine content data portions provided via different communication paths and output audio and video streams.

The audio is decoded by an audio decoder 710 and the video is decoded by a video decoder 714. The audio and/or video decoders 710, 714 are configured to uncompress and/or utilize security information to access protected content. Uncompressed A/V data may be received via an uncompressed A/V interface (e.g., a HDMI interface) that can be selectively utilized.

In one embodiment, the TS includes ancillary information such as one or more of closed caption (CC) data, Program and System Information Protocol (PSIP) information, Program Specific Information (PSIP)), Electronic Program Guide (EPG), etc. However, in other embodiments, the A/V content and/or a subset or all of the ancillary information may be received via the Internet 30 and a network interface 726.

The reception apparatus 20 generally operates under control of at least one processor, such as CPU 738, which is coupled to a working memory 740, program memory 742, and a graphics subsystem 744 via one or more buses (e.g., bus 750). The CPU 738 receives closed caption data from the demux 706 as well as any other information such as EPGs used for rendering graphics, and passes the information to the graphics subsystem 744. The graphics outputted by the graphics subsystem 744 are combined with video images by the compositor and video interface (compositor) 760 to produce an output suitable for display on a video display.

The CPU 738 also receives and processes the split content information (e.g., split content identifier, location information, and security information) from the tuner/demodulator 702, demux 706, or network interface 726 and sends them to the appropriate components. For example, the split content identifier and/or location information are provided to the CPU 738 to retrieve at least one other portion of the content data. In another example, the security information (e.g., a scrambling key) is provided to the audio decoder 410 and/or the video decoder 414. The audio decoder 410 and/or the video decoder 414 use the security information to access protected content data (e.g., a protected content version). The audio and video may be protected separately or combined into a single data stream to which protection is applied.

Although not illustrated in FIG. 7, the CPU 738 may be coupled to any one or a combination of the reception apparatus 20 resources to centralize control of one or more functions. In one embodiment, the CPU 738 also operates to oversee control of the reception apparatus 20 including the tuner/demodulator 702 and other television resources.

A more processor-centric view of the reception apparatus 20 is illustrated in FIG. 8. Working memory 740 and program memory 742 are depicted collectively as memory 810. Further, a processor 800 includes one or more processing units such as CPU 738. Similarly, the various demodulators, decoders, etc., that initially process digital television broadcast signals are collectively depicted as television receiver/tuner 720. The reception apparatus 20 further includes a remote controller 860 which communicates with a remote controller receiver interface 840. Additionally, the display 850 is connected to a display interface 830, which includes for example the uncompressed A/V interface and/or compositor 760, and is either a display integral to the reception apparatus 20 as in a television set or a connected display device as in the case where the reception apparatus 20 is integrated into a set-top box.

Memory 810 contains various functional program modules and data. The memory 810 stores the data used by the reception apparatus 20. Data stored by the reception apparatus 20 include the split content information. The memory 810 within the reception apparatus 20 can be implemented using disc storage form as well as other forms of storage such as non-transitory storage devices including for example network memory devices, magnetic storage elements, magneto-optical storage elements, flash memory, core memory and/or other non-volatile storage technologies. It is noted that the term "non-transitory" is a limitation of the medium itself (i.e., tangible, not a signal) as opposed to a limitation on data storage persistency (e.g., RAM vs. ROM).

Network interface 826 is used by the reception apparatus 20 to access one or more communication networks such as the Internet 130. For example, the reception apparatus 20 utilizes the network interface 826 to access a server (e.g., broadcast server 140) to obtain at least one other content data portion. In one embodiment, the reception apparatus 20 automatically retrieves the other portion of the content data based on location information provided in the digital television broadcast signal. In another embodiment, the reception apparatus 20 is directed to a broadcaster's webpage to acquire the other content data portion in response to the occurrence of a predetermined event. Exemplary events include when the reception apparatus 120 tunes to the broadcaster's channel for the first time, in response to a user's acceptance of a license displayed by the reception apparatus 20, in response to a prompt that an enhanced content version is available, etc.

In certain embodiments, a user of the reception apparatus 20 is required to accept a license to access the at least one other content data portion. The license can be accepted by the user using various methods, such as a user response to a license included in the television broadcast signal or the acceptance of the license via a broadcaster's website.

Figure 9:
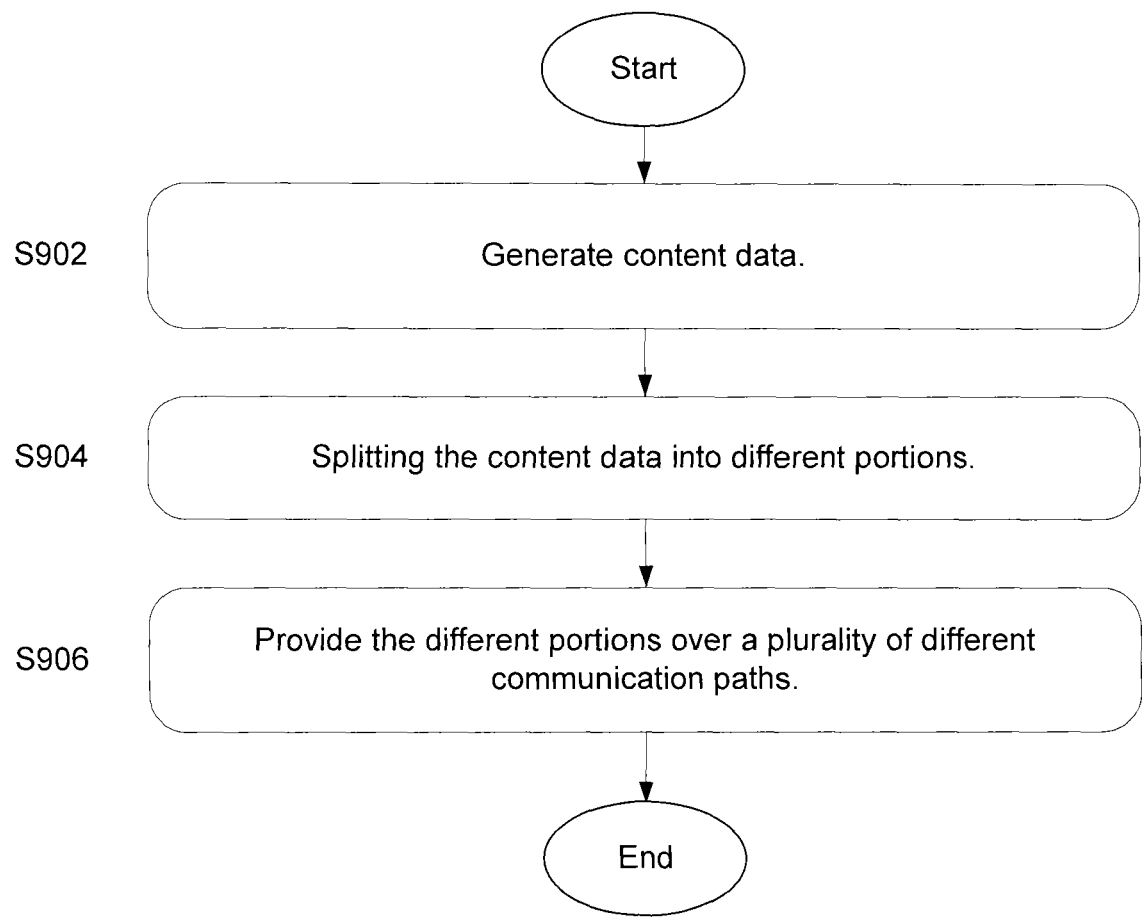
FIG. 9 is an overview of a method for providing content data.

FIG. 9 is a general overview of a method for providing content data to the reception apparatus 20. At step S902, the information providing system 10 generates the content data. The content data includes at least one version of a content. For example, as described above, the content data includes an SDTV version and an HDTV version of the same content.

At step S904, the generated content data is split into different portions. As described above, the content data may be split according to one or a combination of different factors. For example, when a version of the content must be receivable via a single communication path, the content data is split in such a manner that at least the content data portion associated with that version of the content (e.g., SDTV content data) is provided via the single communication path. When no versions of the content are to be receivable via a single communication path, the content data is split in such a manner that the content data portion associated with any version of the content is split between at least two different physical communication paths.

The content data may be split at any time during the processing of the content data for transmission, up to the point the content data is provided to the reception apparatus 20. For example, the content data may be parsed or otherwise split before or after it goes to the physical layer.

At step S906, the different content data portions are provided over different communication paths.

Figure 10:
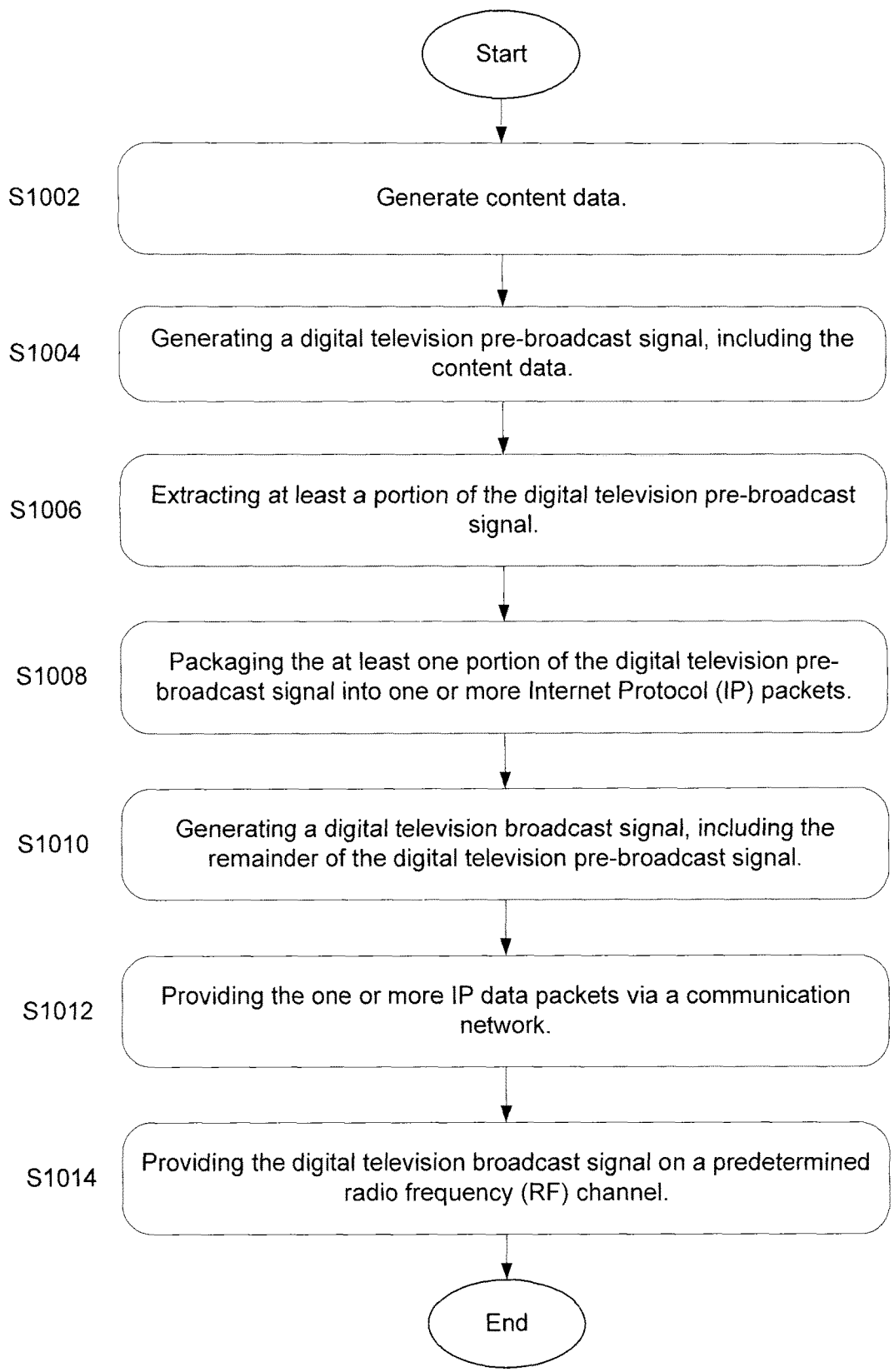
FIG. 10 is a flow diagram of an exemplary method for providing the content data.

FIG. 10 is a flow diagram of a method of the information providing apparatus 10 for providing content to the reception apparatus 20. At step S1002, the information providing apparatus 10 generates content data. The content data includes at least one version of the content. For example, as described above, the content data includes an SDTV version and an HDTV version of the same content.

At step S1004, the information providing system 10 generates a digital television pre-broadcast signal (e.g., a baseband broadcast signal), including the content data. For example, in the case of an 8-VSB system, the content data is readied for VSB modulation by the blocks illustrated in FIG. 5A to generate the digital television pre-broadcast signal. In the case of an OFDM-based system, the content data is readied for OFDM generation by the blocks illustrated in FIGS. 6A-6C to generate the digital television pre-broadcast signal.

At step S1006, the information providing system 10 extracts at least one portion of the digital television pre-broadcast signal. In the case of VSB modulation, a single suppressed carrier needs all data to be modulated to fill the entire channel. Therefore, Trellis coded segments (832 bytes in length) which pertain to a protected content data portion (e.g., an HDTV content data portion) are selected for Internet transmission. Those pieces where selected are refilled with other values, for example pseudorandom binary sequence (PRBS) streams, for the legacy 8-VSB transmission.

In the case of OFDM, certain carriers can be selected regardless of content being protected or in the clear. (However for legacy support data carriers for protected content only can be selected). Those carriers can be aggregated together to form another data segment for input to another IFFT for transmission to the Internet. The selected carriers can either be removed from the legacy path, leaving a smaller amount of carriers and therefore a smaller FFT size needed for legacy channel support, or they can be replaced with random data (e.g., a PRBS stream) to keep the legacy FFT size intact. If a smaller FFT size is selected, a more robust signal will result and further enhance mobile device robustness.

The extraction, as described above, is performed according to one or a combination of factors. For example, in the case of an 8-VSB system, at least one symbol output by the 8-level symbol mapper or inputted into the VSB modulator is extracted. In the case of an OFDM-based system, at least one of the modulated symbols inputted in the DAC or carriers, for example prior to the IFFT, is extracted. An example of the OFDM carriers is illustrated in FIGS. 12A-12B.

These series of symbol packing could then be sent down an Ethernet line (with the symbol rate of transmission which=10.762238 Msym/sec or the compacted 4.03583925 MByte/sec for 8-VSB transmission). The 100Base-T Ethernet (IEEE 802.3u) standard could support these rates.

At step S1008, the information providing system 10 packages the at least one portion of the digital television pre-broadcast signal into one or more IP data packets. For example, in the case of the 8-VSB system, the symbols are the data portion of the signal. There is a segment sync and field sync added to these symbols, but they use the symbols {-5, 5} which are a subset of the 8-level symbol mapper. These symbols could simply be taken to form bytes (e.g., 8-bit versions of the 3-bit symbol, or a combination of 3-bit symbols into 24-bit chunks (8 symbols into 3 bytes)) and packed into an IP data packet. Exemplary IP packets are illustrated in FIGS. 11A-11B.

At step S1010, the information providing system 10 generates a digital television broadcast signal, which includes the remainder of the digital television pre-broadcast signal. The digital television broadcast signal is generated with the extracted at least one portion of the digital television pre-broadcast signal removed or replaced with other values. For example, in the case of the 8-VSB system, the remainder of the VSB digital television broadcast signal generation process is performed. In one embodiment, the modulator modulates the remainder of the digital television pre-broadcast signal. In the case of the OFDM-based system, the remainder of the OFDM-based digital television broadcast signal generation process is performed. In one embodiment, the DAC converts, or the IFFT transforms, the remainder of the digital television pre-broadcast signal.

At step S1012, the one or more IP data packets are provided to the reception apparatus 20 via one or more communication networks (e.g., the Internet 30). In one embodiment, the one or more IP data packets are provided by the broadcast server 14. Access to the broadcast server 14 may be restricted. For example, access to the broadcast server 14 may be restricted to users that have been accepted and granted a license.

Figure 13:
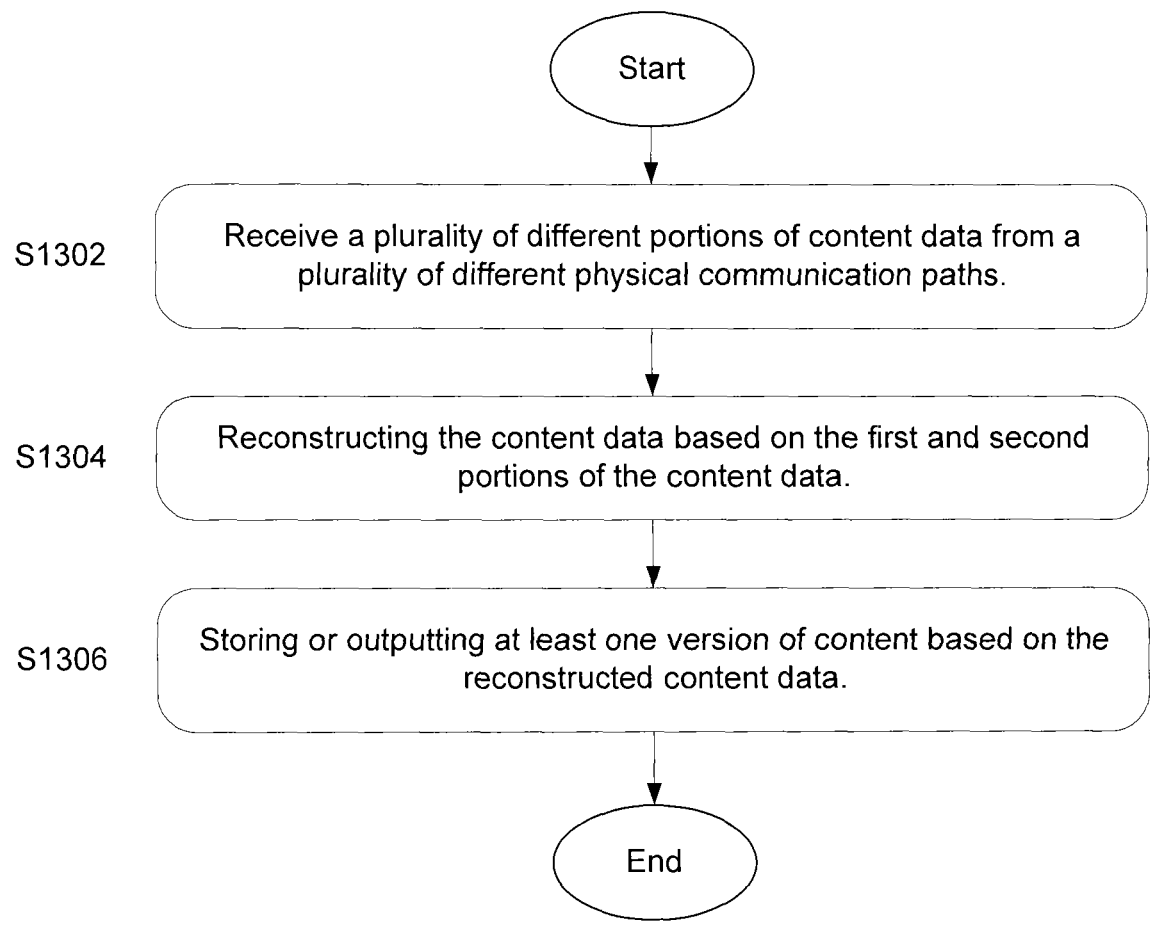
FIG. 13 is an overview of a method for receiving the content data.

FIG. 13 illustrates a general overview of a method for receiving split content. At step S1302, the reception apparatus 20 receives a plurality of different portions of content data from a plurality of different physical communication paths.

At step S1304, the reception apparatus 20 reconstructs the content data based on the received plurality of different portions of the content data. At step S1306, the reception apparatus 20 stores or outputs at least one version of content based on the reconstructed content data.

Figure 14:
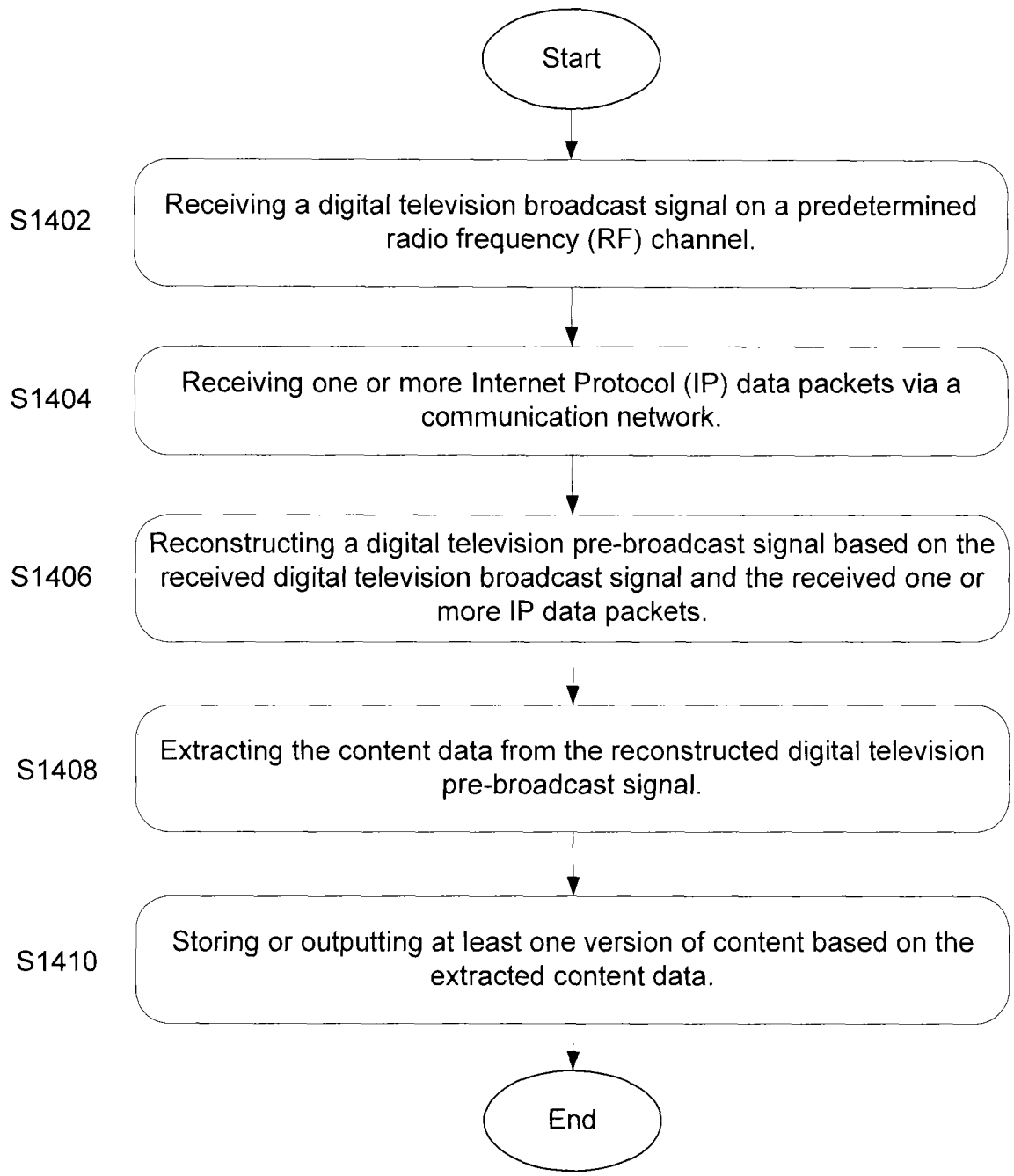
FIG. 14 is a flow diagram of an exemplary method for receiving the content data.

FIG. 14 is a flow diagram of an exemplary method of the reception apparatus 20 for receiving split content. At step S1402, the reception apparatus 20 receives a digital television broadcast signal on a predetermined RF channel. For example, the reception apparatus 20 receives the digital television broadcast signal in response to receiving an instruction from a user to tune to a particular broadcast channel.

At step S1404, the reception apparatus 20 receives one or more IP data packets via a communication network (e.g., the Internet 30). In certain embodiments, the reception apparatus 20 determines the location of the one or more IP data packets based on location information included in the digital television broadcast signal, for example based on location information embedded in a reserved portion of a data field sync segment of the digital television broadcast signal, as described above. However, the location information may be embedded in any other portion of the digital television broadcast signal or embedded in the portion of the content data provided via the digital television broadcast signal. In another embodiment, the location information is registered by the user, for example by manual input or visiting the broadcaster's website.

At step S1406, the reception apparatus 20 reconstructs a digital television pre-broadcast signal (e.g., a complete baseband signal) based on the received digital television broadcast signal and the received one or more IP data packets. In another embodiment, the reception apparatus 20 reconstructs a data stream (e g., a TS, content data stream, etc.) including the content data after performing any necessary processing on the digital television broadcast signal and the one or more IP data packets.

At step S1408, the reception apparatus 20 extracts the content data from the reconstructed digital television pre-broadcast signal. In another embodiment, if necessary, the reception apparatus 20 extracts the content data from the reconstructed data stream. At step S1410, the reception apparatus 20 stores or outputs at least one version of content based on the extracted content data.

Figure 16:
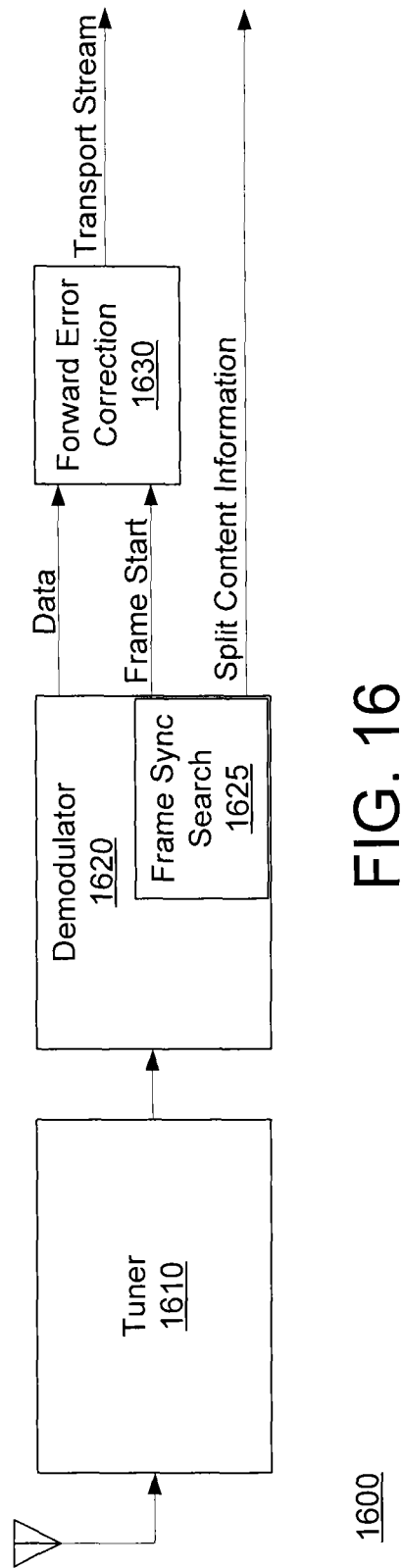
FIG. 16 is an example of circuitry for processing of the data field sync segment.

FIG. 16 illustrates exemplary circuitry 1600 of the reception apparatus 20, which is configured to extract split content information from a data field segment. The circuitry includes a tuner 1610, a demodulator 1620, and a FEC unit 1630. The demodulator 1620 includes a frame sync search unit 1625. According to an embodiment of the present disclosure, the frame sync search unit 1625 uses the pseudo-random sequences in the data field sync segment 1500 to synchronize the FEC unit with the start of a data field. Further, the frame sync search unit 1625 begins a trellis decoding operation when the FEC unit 1630 is synchronized. The frame sync search unit 1625 continues to process the data field sync segment 1500 after FEC synchronization in order to obtain split content information and use it to access split content.

Figure 17:
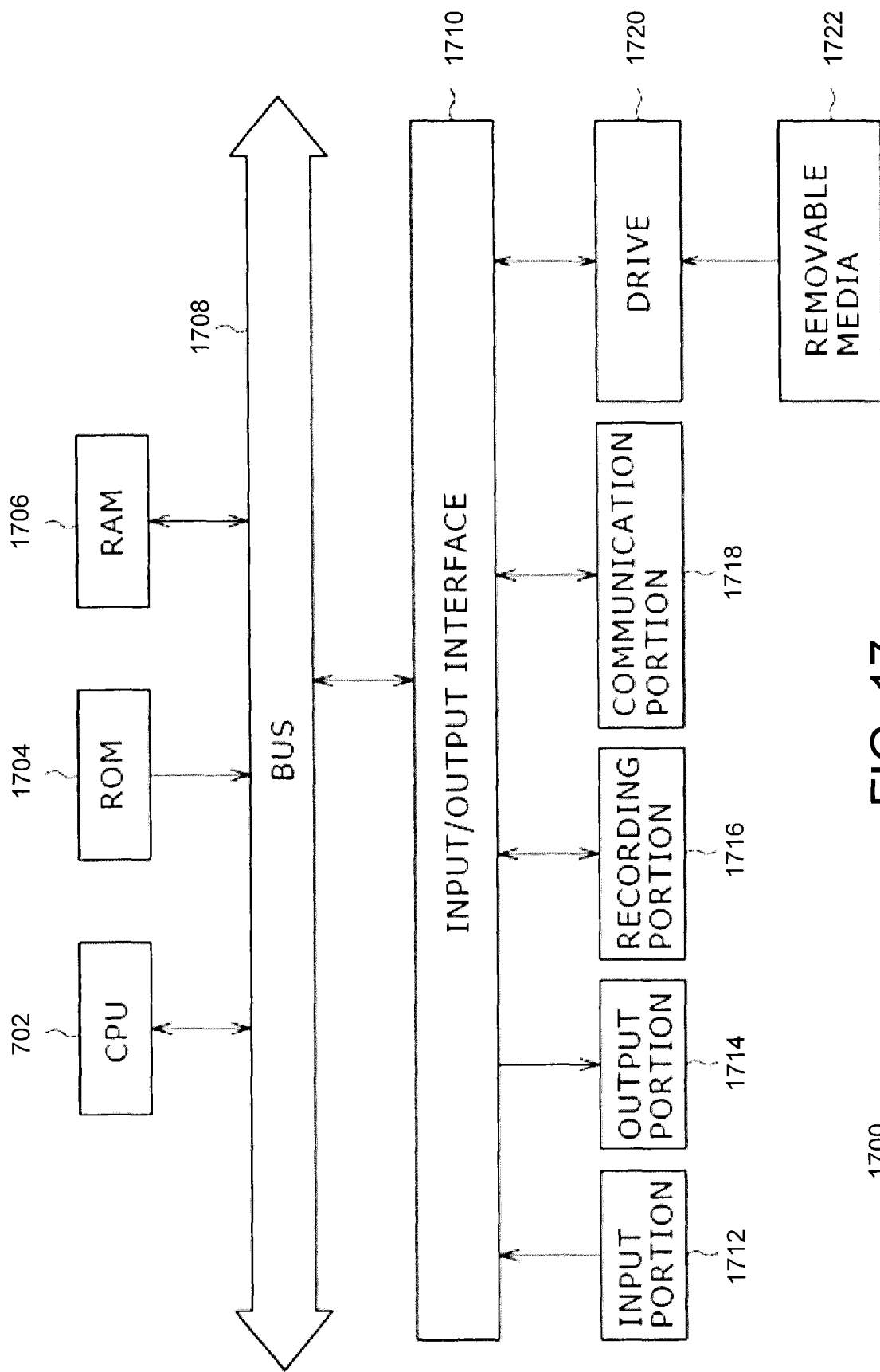
FIG. 17 is an exemplary computer.

FIG. 17 is a block diagram showing an example of a hardware configuration of a computer 1700 that can be configured to function as, control, or incorporate, any one or a combination of the information providing system 10, reception apparatus 20, and components thereof (e g., content source 12, broadcast server 14).

As illustrated in FIG. 17, the computer 1700 includes a central processing unit (CPU) 1702, read only memory (ROM) 1704, and a random access memory (RAM) 1706 interconnected to each other via one or more buses 1708. The one or more buses 1708 is further connected with an input-output interface 1710. The input-output interface 1710 is connected with an input portion 1712 formed by a keyboard, a mouse, a microphone, remote controller, etc. The input-output interface 1712 is also connected to a output portion 1714 formed by an audio interface, video interface, display, speaker, etc.; a recording portion 1216 formed by a hard disk, a non-volatile memory, etc.; a communication portion 1718 formed by a network interface, modem, USB interface, fire wire interface, etc.; and a drive 1720 for driving removable media 1722 such as a magnetic disk, an optical disk, a magneto-optical disk, a semiconductor memory, etc.

According to one embodiment, the CPU 1702 loads one or more programs stored in the recording portion 1716 into the RAM 1706 via the input-output interface 1710 and the bus 1708, and then executes a program configured to provide the functionality of the one or combination of the information providing system 10, reception apparatus 20, and components thereof (e.g., content source 12, broadcast server 14).

In certain embodiments, at least a portion of content data provided by the information providing system 10 is tied to a license. The licensed content data portion may be tied to at least one version of the underlying content. The license provides one or more service providers with control over, and a possible legal basis for, who gets access to their content (e.g., to control retransmission rights). In one embodiment, the license is tied to each broadcast receiver.

Depending on the embodiment, one or a combination of receipt of the licensed content data portion, receipt of the split content information, or use of the split content information is only permissible by the general public, for personal use, to which a free license is granted. A free license, however, is not granted to other entities, for example entities that retransmit service provider content. In one embodiment, a user that receives a content data portion from a non-terrestrial broadcast channel is required to accept a license agreement prior to presentation of any content based on that content data portion.

For example, a user may be required to accept a license agreement that is presented to the user by the reception apparatus 20 before the non-terrestrial broadcast content data portion can be presented to the user. Acceptance of the license may be service provider specific or apply to a plurality of different service providers. The user accepts the license via a remote control, in one example. The displayed license can be generate, for example based on license data included in the television broadcast signal or obtained over another communication medium such as the Internet.

As described above, in one embodiment, split content information is included in the data field sync segment 1500. However, in other embodiments the split content information is contained in other portions of the digital television broadcast signal, for example in other transmission systems in which a data field sync segment is not present. For example, the split content information could be placed in a Kasami sequence via RF watermarking, an unused closed caption service (e.g., service #6) or otherwise embedded in the portion of content data provided in the digital television broadcast signal. In other embodiments, the split content information is provided via another communication network such as the Internet.

Embodiments of the present disclosure are also applicable to send more data than supported for by the RF path alone, which could alleviate possible bandwidth constraint problems for high data rate applications. For example, 8K video content may be sent in pieces (one portion via RF and another portion via the Internet). As described above, this could also provide a secure way for users to utilize the RF path to get their content, by using RF as one piece of a transmission for security.

Although embodiments of the present disclosure are discussed with respect to content provided on terrestrial broadcast channels, more particularly television broadcast channels, the present disclosure is applicable to other RF broadcasts such as radio station broadcasts, satellite broadcasts, and any other communication methods.

Further, although embodiments of the present disclosure have been described primarily using a combination of an RF channel and the Internet, any other combinations of communication paths can be utilized.

Further, although certain embodiments of the present disclosure have been described in which at least a portion of content data is provided over a single Internet connection channel, in other embodiments multiple Internet connection channels are utilized. Separate IP addresses could be used to parse out the broadcast packets. This allows for further content protection, but it may be cumbersome to the receiver to recombine all packets before processing. However, DRM keys or other security information could be sent in one of the IP packets or all of them and allow content protection via a different medium (e.g., not the RF transmission) to unlock content. This is possibly a more secure way for broadcasters to protect their content.

Many people have smart phones which allow data to be sent to and from their phones. Currently 4G LTE is available which support high data rates of transmission. With any connection to the Internet, whether it is via a cable modem or smart phone, a television can recover all content protected data. Furthermore, this Internet connection brings in a return path to the broadcaster to collect information from the users. This allows the interaction features which are being developed now in standards (e.g., Hybrid Broadcasting, Hybrid Broadcast Broadband Television (HbbTV), etc.). As connections to the Internet are becoming more available, services can become to depend on that connection.

The various processes discussed above need not be processed chronologically and/or in the sequence depicted as flowcharts; the steps may also include those processed in parallel or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a system, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Numerous modifications and variations of the present disclosure are possible in light of the above teachings. It is therefore to be understood that within the scope of the appended claims, the present disclosure may be practiced otherwise than as specifically described herein.

The above disclosure also encompasses the embodiments noted below.

(1) A method of an information providing system for providing content to a reception apparatus, the method including: generating content data; generating a digital television pre-broadcast signal, including the content data; extracting at least one portion of the digital television pre-broadcast signal; packaging the at least one portion of the digital television pre-broadcast signal into one or more Internet Protocol (IP) data packets; generating a digital television broadcast signal, including the remainder of the digital television pre-broadcast signal; providing the one or more IP data packets via a communication network; and providing the digital television broadcast signal on a predetermined radio frequency (RF) channel.

(2) The method of feature (1), in which the step of generating the digital television pre-broadcast signal includes: generating a transport stream, including the content data; and applying forward error correction to the generated transport stream.

(3) The method of features (1) or (2), in which the step of generating the digital television broadcast signal includes: modulating the remaining portion of the digital television pre-broadcast signal; and up converting the modulated remaining portion of the digital television pre-broadcast signal for transmission on the predetermined RF channel.

(4) The method of any of features (1) to (3), in which the step of packaging includes: forming bytes based on symbols representing the at least one portion of the digital television pre-broadcast signal; and packing the encrypted bytes into the one or more IP data packets.

(5) The method of any of features (1) to (4), in which the digital television broadcast signal is one of an 8-level vestigial sideband (8-VSB) or orthogonal frequency-division multiplexing (OFDM)-based signal.

(6) A non-transitory computer-readable storage medium having embedded therein instructions, which when executed by one or more processors, cause the one or more processors to perform the method of any of features (1) to (5).

(7) An information providing system, including circuitry configured to generate content data, generate a digital television pre-broadcast signal, including the content data; extract at least one portion of the digital television pre-broadcast signal; package the at least one portion of the digital television pre-broadcast signal into one or more Internet Protocol (IP) data packets; generate a digital television broadcast signal, including the remainder of the digital television pre-broadcast signal; provide the one or more IP data packets via a communication network; and provide the digital television broadcast signal on a predetermined radio frequency (RF) channel.

(8) The information providing system of feature (7), in which the circuitry is further configured to generate a transport stream, including the content data, and apply forward error correction to the generated transport stream to generate the digital television pre-broadcast signal.

(9) The information providing system of feature (7) or (8), in which the circuitry is further configured to modulate the remaining portion of the digital television pre-broadcast signal, and up convert the modulated remaining portion of the digital television pre-broadcast signal for transmission on the predetermined RF channel.

(10) The information providing system of any of features (7) to (9), in which the circuitry is further configured to form bytes based on symbols representing the at least one portion of the digital television pre-broadcast signal, and pack the bytes into the one or more IP data packets to package the at least one portion of the digital television pre-broadcast signal.

(11) The information providing system of any of features (7) to (10), in which the digital television broadcast signal is one of an 8-level vestigial sideband (8-VSB) or orthogonal frequency-division multiplexing (OFDM)-based signal.

(12) A method of a reception apparatus for receiving content data, the method including: receiving a digital television broadcast signal on a predetermined radio frequency (RF) channel, the digital television broadcast signal including a portion of a digital television pre-broadcast signal; receiving one or more IP data packets via a communication network, the one or more IP data packets containing the remainder of the digital television pre-broadcast signal, reconstructing the digital television pre-broadcast signal based on the received digital television broadcast signal and the received one or more IP data packets; extracting the content data from the reconstructed digital television pre-broadcast signal; and storing or outputting the extracted content data.

(13) The method of feature (12), in which the step of reconstructing includes: demodulating the digital television broadcast signal; and combining the demodulated digital television broadcast signal and the remainder of the digital television pre-broadcast signal represented by the one or more IP data packets.

(14) The method of features (12) or (13), in which the digital television broadcast signal is one of an 8-level vestigial sideband (8-VSB) or orthogonal frequency-division multiplexing (OFDM)-based signal.

(15) A non-transitory computer-readable storage medium having embedded therein instructions, which when executed by one or more processors, cause the one or more processors to perform the method of any of features (12) to (14).

16. A reception apparatus, including circuitry configured to receive a digital television broadcast signal on a predetermined radio frequency (RF) channel, the digital television broadcast signal including a portion of a digital television pre-broadcast signal, receive one or more IP data packets via a communication network, the one or more IP data packets containing the remainder of the digital television pre-broadcast signal, reconstruct the digital television pre-broadcast signal based on the received digital television broadcast signal and the received one or more IP data packets, extract the content data from the reconstructed digital television pre-broadcast signal, and store or output the extracted content data.

(17) The reception apparatus of feature (16), in which the circuitry is further configured to demodulate the digital television broadcast signal, and combine the demodulated digital television broadcast signal and the remainder of the television pre-broadcast signal represented by the one or more IP data packets.

(18) The reception apparatus of features (16) or (17), in which the digital television broadcast signal is one of an 8-level vestigial sideband (8-VSB) or orthogonal frequency-division multiplexing (OFDM)-based signal.

The invention claimed is:

1. A method for providing content, the method comprising:
splitting, by circuitry of a transmission apparatus, symbols generated from content data into a first set of symbols and a second set of symbols for transmission over a plurality of communication paths, the first and second set of symbols being generated by a symbol mapper;

packaging, by the circuitry, the first set of symbols of the content data into one or more Internet Protocol (IP) data packets;

generating, by the circuitry, a digital television broadcast signal including the second set of symbols of the content data and location information;

providing, by the circuitry, the first set of symbols of the content data via a first one of the plurality of communication paths; and broadcasting, by the circuitry, the second set of symbols of the content data via a second one of the plurality of communication paths, wherein the second set of symbols of the content data is broadcast via the second one of the plurality of communication paths with the location information for acquiring the first set of symbols of the content data via the first one of the plurality of communication paths, the content data is reconstructed based on the first set of symbols and the second set of symbols of the content data and decoded by a reception apparatus in response to the reception apparatus receiving the broadcast of the second set of symbols of the content data with the location information for acquiring the first set of symbols of the content data via the first one of the plurality of communication paths, the first one of the plurality of communication paths is a communication network, and the second one of the plurality of communication paths is a predetermined radio frequency (RF) channel.

2. The method of claim 1, wherein the step of splitting comprises:

splitting the content data in the physical layer.

3. A non-transitory computer-readable storage medium having embedded therein instructions, which when executed by one or more processors, cause the one or more processors to perform the method of claim 1.

4. An information providing apparatus, comprising:
a communication interface; and
processing circuitry configured to
split content data into a first set of symbols and a second set of symbols for transmission over a plurality of communication paths, the first and second set of symbols being generated by a symbol mapper;
package the first set of symbols of the content data into one or more Internet Protocol (IP) data packets;
generate a digital television broadcast signal including the second set of symbols of the content data and location information;
provide, through the communication interface, the first set of symbols of the content data via a first one of the plurality of communication paths; and
broadcast the second set of symbols of the content data via a second one of the plurality of communication paths, wherein
the second set of symbols of the content data is broadcast via the second one of the plurality of communication paths with the location information for acquiring the first set of symbols of the content data via the first one of the plurality of communication paths,
the content data is reconstructed based on the first set of symbols and the second set of symbols of the content data and decoded by a reception apparatus in response to the reception apparatus receiving the broadcast of the second set of symbols of the content data with the location information for acquiring the first set of symbols of the content data via the first one of the plurality of communication paths,
the first one of the plurality of communication paths is a communication network, and
the second one of the plurality of communication paths is a predetermined radio frequency (RF) channel.

5. The information providing apparatus according to claim 4, wherein the circuitry is further configured to split the content data in the physical layer.

6. A method for receiving content data, the method comprising:
receiving, by circuitry of a reception apparatus, a broadcast of a digital television broadcast signal, which includes a second set of symbols of the content data and location information for acquiring a first set of symbols of the content data via a first one of a plurality of communication paths, via a second one of the plurality of communication paths, the first and second set of symbols being generated by a symbol mapper;
in response to receiving the broadcast of the second set of symbols of the content data with the location information for acquiring the first set of symbols of the content data via the first one of the plurality of communication paths,
downloading, by the circuitry, the first set of symbols of the content data via the first one of the plurality of communication paths according to the location information received with the broadcast of the second set of symbols of the content data;
reconstructing, by the circuitry, the content data based on the received first set of symbols and the received second set of symbols of the content data; and
decoding and outputting for display the reconstructed content data, wherein
the first set of symbols of the content data is packaged into one or more Internet Protocol (IP) packets,
the first one of the plurality of communication paths is a communication network, and
the second one of the plurality of communication paths is a predetermined radio frequency (RF) channel.

7. The method according to claim 6, wherein the step of reconstructing comprises:
reconstructing the content data in the application layer.

8. The method according to claim 6, wherein the step of reconstructing comprises:
reconstructing the content data in the physical layer.

9. A non-transitory computer-readable storage medium having embedded therein instructions, which when executed by one or more processors, cause the one or more processors to perform the method of claim 6.

10. A reception apparatus, comprising:
a communication interface; and
processing circuitry configured to
receive a broadcast of a digital television broadcast signal, which includes a second set of symbols of content data and location information for acquiring a first set of symbols of the content data via a first one of a plurality of communication paths, via a second one of the plurality of communication paths, the first and second set of symbols being generated by a symbol mapper;
in response to receipt of the broadcast of the second set of symbols of the content data with the location information for acquiring the first set of symbols of the content data via the first one of the plurality of communication paths, download, through the communication interface, the first set of symbols of the content data via the first one of the plurality of communication paths according to the location information received with the broadcast of the second set of symbols of the content data;

reconstruct the content data based on the received first set of symbols and the received second set of symbols of the content data; and decode and output for display the reconstructed content data, wherein the first set of symbols of the content data is packaged into one or more Internet Protocol (IP) packets, the first one of the plurality of communication paths is a communication network, and the second one of the plurality of communication paths is a predetermined radio frequency (RF) channel.

11. The reception apparatus according to claim 10, wherein the circuitry is further configured to reconstruct the content data in the physical layer.

12. The reception apparatus according to claim 10, wherein the location information for acquiring the first set of symbols of the content data includes network address information for the reception apparatus to access the first set of symbols of the content data provided via the first one of the plurality of communication paths.

13. The reception apparatus according to claim 10, wherein the location information is embedded in a reserved portion of a data field sync segment of the digital television broadcast signal.

14. The reception apparatus according to claim 10, wherein the first and second set of symbols include data symbols that are generated by the symbol mapper of a modulation system.

15. The reception apparatus according to claim 14, wherein the modulation system is an orthogonal frequency-division multiplexing (OFDM) system.

\* \* \* \* \*